(12) United States Patent
Doyle et al.

(10) Patent No.: US 8,139,089 B2
(45) Date of Patent: *Mar. 20, 2012

(54) NAVIGATING DIGITAL IMAGES USING DETAIL-IN-CONTEXT LENSES

(75) Inventors: Michael Doyle, Vancouver (CA); Zeenat Jetha, N. Vancouver (CA); Garth B. D. Shoemaker, Vancouver (CA)

(73) Assignee: Noregin Assets, N.V., L.L.C., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/388,437

(22) Filed: Feb. 18, 2009

(65) Prior Publication Data

US 2010/0045702 A1 Feb. 25, 2010

Related U.S. Application Data

(63) Continuation of application No. 10/989,070, filed on Nov. 16, 2004, now Pat. No. 7,495,678.

(30) Foreign Application Priority Data

Nov. 17, 2003 (CA) .................................... 2449888

(51) Int. Cl.
*G09G 5/00* (2006.01)

(52) U.S. Cl. ........ 345/647; 345/660; 345/661; 345/619; 715/800

(58) Field of Classification Search .................. 345/619, 345/647, 660, 661, 629, 666; 715/850, 866, 715/767, 781, 800, 801
See application file for complete search history.

(56) References Cited

U.S. PATENT DOCUMENTS

| 3,201,546 | A | 8/1965 | Richardson |
| 3,704,938 | A | 12/1972 | Fanselow |
| 3,739,739 | A | 6/1973 | Brase |
| 3,762,799 | A | 10/1973 | Shapiro |
| 4,581,647 | A | 4/1986 | Vye |
| 4,630,110 | A | 12/1986 | Cotton et al. |
| 4,688,181 | A | 8/1987 | Cottrell et al. |

(Continued)

FOREIGN PATENT DOCUMENTS

CA 2350342 11/2002

(Continued)

OTHER PUBLICATIONS

"BPAI Decision", U.S. Appl. No. 10/682,298, (Dec. 30, 2009), 14 pages.
"Notice of Allowance", U.S. Appl. No. 11/410,024, (Jan. 4, 2010), 7 pages.

(Continued)

*Primary Examiner* — Chante Harrison
(74) *Attorney, Agent, or Firm* — McAndrews, Held & Malloy, Ltd.

(57) ABSTRACT

In an implementation, an appearance of lens is displayed on a display device for a selected region of an image to magnify the selected region of the image in comparison with a portion of the image outside of the appearance of the lens. A zoomed-in view of the image is displayed on the display device by increasing magnification of the portion of the image outside the appearance of the lens successively as an animation until the magnification of the portion of the image outside of the appearance of the lens corresponds with the magnification of the selected region of the image within the appearance of the lens, at which point the appearance of the lens is no longer displayed.

36 Claims, 14 Drawing Sheets

U.S. PATENT DOCUMENTS

| | | | |
|---|---|---|---|
| 4,757,616 A | 7/1988 | Hills |
| 4,790,028 A | 12/1988 | Ramage |
| 4,800,379 A | 1/1989 | Yeomans |
| 4,885,702 A | 12/1989 | Ohba |
| 4,888,713 A | 12/1989 | Falk |
| 4,970,028 A | 11/1990 | Kenyon et al. |
| 4,985,849 A | 1/1991 | Hideaki |
| 4,992,866 A | 2/1991 | Morgan |
| 5,031,918 A | 7/1991 | Brill |
| 5,048,077 A | 9/1991 | Wells et al. |
| 5,175,808 A | 12/1992 | Sayre |
| 5,185,599 A | 2/1993 | Dornink et al. |
| 5,185,667 A | 2/1993 | Zimmerman |
| 5,200,818 A | 4/1993 | Neta et al. |
| 5,206,721 A | 4/1993 | Ashida et al. |
| 5,227,771 A | 7/1993 | Kerr et al. |
| 5,250,934 A | 10/1993 | Denber et al. |
| 5,258,837 A | 11/1993 | Gormley |
| 5,269,687 A | 12/1993 | Mott et al. |
| 5,275,019 A | 1/1994 | Pagani |
| 5,309,279 A | 5/1994 | Halstead |
| 5,321,807 A | 6/1994 | Mumford |
| 5,329,310 A | 7/1994 | Liljegren et al. |
| 5,341,466 A | 8/1994 | Perlin et al. |
| 5,369,527 A | 11/1994 | McCracken |
| 5,416,900 A | 5/1995 | Blanchard et al. |
| 5,432,895 A | 7/1995 | Myers |
| 5,451,998 A | 9/1995 | Hamrick |
| 5,459,488 A | 10/1995 | Geiser |
| 5,473,740 A | 12/1995 | Kasson |
| 5,521,634 A | 5/1996 | McGary |
| 5,523,783 A | 6/1996 | Cho |
| 5,528,289 A | 6/1996 | Cortjens et al. |
| 5,539,534 A | 7/1996 | Hino et al. |
| 5,581,670 A | 12/1996 | Bier et al. |
| 5,583,977 A | 12/1996 | Seidl |
| 5,588,098 A | 12/1996 | Chen et al. |
| 5,594,859 A | 1/1997 | Palmer et al. |
| 5,596,690 A | 1/1997 | Stone et al. |
| 5,598,297 A | 1/1997 | Yamanaka et al. |
| 5,610,653 A | 3/1997 | Abecassis |
| 5,613,032 A | 3/1997 | Cruz et al. |
| 5,638,523 A | 6/1997 | Mullet et al. |
| 5,644,758 A | 7/1997 | Patrick |
| 5,651,107 A | 7/1997 | Frank et al. |
| 5,652,851 A | 7/1997 | Stone et al. |
| 5,657,246 A | 8/1997 | Hogan et al. |
| 5,670,984 A * | 9/1997 | Robertson et al. ............ 345/647 |
| 5,680,524 A | 10/1997 | Maples et al. |
| 5,682,489 A | 10/1997 | Harrow et al. |
| 5,689,287 A | 11/1997 | Mackinlay et al. |
| 5,689,628 A | 11/1997 | Robertson |
| 5,721,853 A | 2/1998 | Smith |
| 5,729,673 A | 3/1998 | Cooper et al. |
| 5,731,805 A | 3/1998 | Tognazzini et al. |
| 5,742,272 A | 4/1998 | Kitamura et al. |
| 5,745,166 A | 4/1998 | Rhodes et al. |
| 5,751,289 A | 5/1998 | Myers |
| 5,754,348 A | 5/1998 | Soohoo |
| 5,764,139 A | 6/1998 | Nojima et al. |
| 5,786,814 A | 7/1998 | Moran et al. |
| 5,798,752 A | 8/1998 | Buxton et al. |
| 5,808,670 A | 9/1998 | Oyashiki et al. |
| 5,812,111 A | 9/1998 | Fuji et al. |
| 5,818,455 A | 10/1998 | Stone et al. |
| 5,848,231 A | 12/1998 | Teitelbaum et al. |
| 5,852,440 A | 12/1998 | Grossman et al. |
| 5,872,922 A | 2/1999 | Hogan et al. |
| 5,909,219 A | 6/1999 | Dye |
| 5,923,364 A | 7/1999 | Rhodes et al. |
| 5,926,209 A | 7/1999 | Glatt |
| 5,949,430 A | 9/1999 | Robertson et al. |
| 5,950,216 A | 9/1999 | Amro et al. |
| 5,959,605 A * | 9/1999 | Gilblom ...................... 345/661 |
| 5,969,706 A | 10/1999 | Tanimoto et al. |
| 5,973,694 A | 10/1999 | Steele et al. |
| 5,991,877 A | 11/1999 | Luckenbaugh |
| 5,999,879 A | 12/1999 | Yano |
| 6,005,611 A | 12/1999 | Gullichsen et al. |
| 6,037,939 A | 3/2000 | Kashiwagi et al. |
| 6,052,110 A | 4/2000 | Sciammarella et al. |
| 6,057,844 A | 5/2000 | Strauss |
| 6,064,401 A | 5/2000 | Holzman et al. |
| 6,067,372 A | 5/2000 | Gur et al. |
| 6,072,501 A | 6/2000 | Bier |
| 6,073,036 A | 6/2000 | Heikkinen et al. |
| 6,075,531 A | 6/2000 | DeStefano |
| 6,081,277 A | 6/2000 | Kojima |
| 6,084,598 A | 7/2000 | Chekerylla |
| 6,091,771 A | 7/2000 | Seeley et al. |
| 6,108,005 A | 8/2000 | Starks et al. |
| 6,128,024 A | 10/2000 | Carver et al. |
| 6,133,914 A | 10/2000 | Rogers et al. |
| 6,147,709 A | 11/2000 | Martin et al. |
| 6,154,840 A | 11/2000 | Pebley et al. |
| 6,160,553 A | 12/2000 | Robertson et al. |
| 6,184,859 B1 | 2/2001 | Kojima |
| 6,198,484 B1 | 3/2001 | Kameyama |
| 6,201,546 B1 | 3/2001 | Bodor et al. |
| 6,201,548 B1 | 3/2001 | Cariffe et al. |
| 6,204,845 B1 | 3/2001 | Bates et al. |
| 6,204,850 B1 | 3/2001 | Green |
| 6,215,491 B1 | 4/2001 | Gould |
| 6,219,052 B1 | 4/2001 | Gould |
| 6,241,609 B1 | 6/2001 | Rutgers |
| 6,246,411 B1 | 6/2001 | Strauss |
| 6,249,281 B1 | 6/2001 | Chen et al. |
| 6,256,043 B1 | 7/2001 | Aho et al. |
| 6,256,115 B1 | 7/2001 | Adler et al. |
| 6,256,737 B1 | 7/2001 | Bianco et al. |
| 6,266,082 B1 | 7/2001 | Yonezawa et al. |
| 6,271,854 B1 | 8/2001 | Light |
| 6,278,443 B1 | 8/2001 | Amro et al. |
| 6,278,450 B1 | 8/2001 | Arcuri et al. |
| 6,288,702 B1 | 9/2001 | Tachibana et al. |
| 6,304,271 B1 | 10/2001 | Nehme |
| 6,307,612 B1 | 10/2001 | Smith et al. |
| 6,320,599 B1 | 11/2001 | Sciammarella et al. |
| 6,337,709 B1 | 1/2002 | Yamaashi et al. |
| 6,346,938 B1 | 2/2002 | Chan et al. |
| 6,346,962 B1 | 2/2002 | Goodridge |
| 6,359,615 B1 | 3/2002 | Singh |
| 6,381,583 B1 | 4/2002 | Kenney |
| 6,384,849 B1 | 5/2002 | Morcos et al. |
| 6,392,661 B1 | 5/2002 | Tankersley |
| 6,396,648 B1 | 5/2002 | Yamamoto et al. |
| 6,396,962 B1 | 5/2002 | Haffey et al. |
| 6,400,848 B1 | 6/2002 | Gallagher |
| 6,407,747 B1 | 6/2002 | Chui et al. |
| 6,411,274 B2 | 6/2002 | Watanabe et al. |
| 6,416,186 B1 | 7/2002 | Nakamura |
| 6,417,867 B1 | 7/2002 | Hallberg |
| 6,438,576 B1 | 8/2002 | Huang et al. |
| 6,487,497 B2 | 11/2002 | Khavakh et al. |
| 6,491,585 B1 | 12/2002 | Miyamoto et al. |
| 6,504,535 B1 | 1/2003 | Edmark |
| 6,515,663 B1 | 2/2003 | Hung et al. |
| 6,515,678 B1 | 2/2003 | Boger |
| 6,522,341 B1 | 2/2003 | Nagata |
| 6,523,024 B1 | 2/2003 | Yajima et al. |
| 6,542,191 B1 | 4/2003 | Yonezawa |
| 6,552,737 B1 | 4/2003 | Tanaka et al. |
| 6,559,813 B1 | 5/2003 | DeLuca et al. |
| 6,577,311 B1 | 6/2003 | Crosby et al. |
| 6,577,319 B1 | 6/2003 | Kashiwagi et al. |
| 6,584,237 B1 | 6/2003 | Abe |
| 6,590,568 B1 | 7/2003 | Astala et al. |
| 6,590,583 B2 | 7/2003 | Soohoo |
| 6,608,631 B1 | 8/2003 | Milliron |
| 6,612,930 B2 | 9/2003 | Kawagoe et al. |
| 6,631,205 B1 | 10/2003 | Melen et al. |
| 6,633,305 B1 | 10/2003 | Sarfield |
| 6,690,387 B2 | 2/2004 | Zimmerman et al. |
| 6,704,034 B1 | 3/2004 | Rodriguez et al. |
| 6,720,971 B1 | 4/2004 | Yamamoto et al. |
| 6,721,655 B1 | 4/2004 | Utsumi |
| 6,727,910 B2 | 4/2004 | Tigges |

| | | |
|---|---|---|
| 6,731,285 B2 | 5/2004 | Matchen |
| 6,731,315 B1 | 5/2004 | Ma et al. |
| 6,744,430 B1 | 6/2004 | Shimizu |
| 6,747,610 B1 | 6/2004 | Taima et al. |
| 6,747,611 B1 | 6/2004 | Budd et al. |
| 6,760,020 B1 | 7/2004 | Uchiyama et al. |
| 6,768,497 B2 | 7/2004 | Baar et al. |
| 6,798,412 B2 | 9/2004 | Cowperthwaite |
| 6,833,843 B2 | 12/2004 | Mojaver et al. |
| 6,842,175 B1 | 1/2005 | Schmalstieg et al. |
| 6,874,126 B1 | 3/2005 | Lapidous |
| 6,882,755 B2 | 4/2005 | Silverstein et al. |
| 6,906,643 B2 | 6/2005 | Samadani et al. |
| 6,911,975 B2 | 6/2005 | Iizuka et al. |
| 6,919,921 B1 | 7/2005 | Morota et al. |
| 6,924,822 B2 | 8/2005 | Card et al. |
| 6,938,218 B1 | 8/2005 | Rosen |
| 6,956,590 B1 | 10/2005 | Barton et al. |
| 6,961,071 B2 | 11/2005 | Montagnese et al. |
| 6,975,335 B2 | 12/2005 | Watanabe |
| 6,985,865 B1 | 1/2006 | Packingham et al. |
| 7,038,680 B2 | 5/2006 | Pitkow |
| 7,055,095 B1 | 5/2006 | Anwar |
| 7,071,971 B2 | 7/2006 | Elberbaum |
| 7,084,886 B2 | 8/2006 | Jetha et al. |
| 7,088,364 B2 | 8/2006 | Lantin |
| 7,106,349 B2 | 9/2006 | Baar et al. |
| 7,133,054 B2 | 11/2006 | Aguera y Arcas |
| 7,134,092 B2 | 11/2006 | Fung et al. |
| 7,158,878 B2 | 1/2007 | Rasmussen |
| 7,173,633 B2 | 2/2007 | Tigges |
| 7,173,636 B2 | 2/2007 | Montagnese |
| 7,194,697 B2 | 3/2007 | Sinclair, II et al. |
| 7,197,718 B1 | 3/2007 | Westerman et al. |
| 7,197,719 B2 | 3/2007 | Doyle et al. |
| 7,213,214 B2 | 5/2007 | Baar et al. |
| 7,233,942 B2 | 6/2007 | Nye |
| 7,246,109 B1 | 7/2007 | Ramaswamy |
| 7,256,801 B2 | 8/2007 | Baar et al. |
| 7,274,381 B2 | 9/2007 | Mojaver et al. |
| 7,275,219 B2 | 9/2007 | Shoemaker |
| 7,280,105 B2 | 10/2007 | Cowperthwaite |
| 7,283,141 B2 | 10/2007 | Baar et al. |
| 7,310,619 B2 | 12/2007 | Baar et al. |
| 7,312,806 B2 | 12/2007 | Tigges |
| 7,321,824 B1 | 1/2008 | Nesbitt |
| 7,411,610 B2 | 8/2008 | Doyle |
| 7,423,660 B2 | 9/2008 | Ouchi et al. |
| 7,443,396 B2 | 10/2008 | Ilic |
| 7,450,114 B2 | 11/2008 | Anwar |
| 7,472,354 B2 | 12/2008 | Jetha et al. |
| 7,486,302 B2 * | 2/2009 | Shoemaker ............ 345/661 |
| 7,489,321 B2 | 2/2009 | Jetha et al. |
| 7,493,572 B2 | 2/2009 | Card et al. |
| 7,495,678 B2 * | 2/2009 | Doyle et al. ............ 345/647 |
| 7,580,036 B2 | 8/2009 | Montagnese |
| 7,667,699 B2 | 2/2010 | Komar |
| 7,698,653 B2 | 4/2010 | Roman et al. |
| 7,714,859 B2 | 5/2010 | Shoemaker |
| 7,737,976 B2 | 6/2010 | Lantin |
| 7,761,713 B2 | 7/2010 | Baar |
| 7,773,101 B2 | 8/2010 | Shoemaker |
| 2001/0040585 A1 | 11/2001 | Hartford et al. |
| 2001/0040636 A1 | 11/2001 | Kato et al. |
| 2001/0048447 A1 | 12/2001 | Jogo |
| 2001/0055030 A1 | 12/2001 | Han |
| 2002/0033837 A1 | 3/2002 | Munro |
| 2002/0038257 A1 | 3/2002 | Joseph et al. |
| 2002/0044154 A1 | 4/2002 | Baar et al. |
| 2002/0062245 A1 | 5/2002 | Niu et al. |
| 2002/0075280 A1 | 6/2002 | Tigges |
| 2002/0087894 A1 | 7/2002 | Foley et al. |
| 2002/0089520 A1 | 7/2002 | Baar |
| 2002/0093567 A1 | 7/2002 | Cromer et al. |
| 2002/0101396 A1 | 8/2002 | Huston et al. |
| 2002/0122038 A1 | 9/2002 | Cowperthwaite |
| 2002/0135601 A1 | 9/2002 | Watanabe et al. |
| 2002/0143826 A1 | 10/2002 | Day et al. |
| 2002/0171644 A1 | 11/2002 | Reshetov et al. |
| 2002/0180801 A1 | 12/2002 | Doyle et al. |
| 2003/0006995 A1 | 1/2003 | Smith et al. |
| 2003/0007006 A1 | 1/2003 | Baar et al. |
| 2003/0048447 A1 | 3/2003 | Harju et al. |
| 2003/0052896 A1 | 3/2003 | Higgins et al. |
| 2003/0052900 A1 * | 3/2003 | Card et al. ............ 345/660 |
| 2003/0061211 A1 | 3/2003 | Shultz et al. |
| 2003/0076363 A1 | 4/2003 | Murphy |
| 2003/0100326 A1 | 5/2003 | Grube et al. |
| 2003/0103063 A1 | 6/2003 | Mojaver et al. |
| 2003/0105795 A1 | 6/2003 | Anderson et al. |
| 2003/0112503 A1 | 6/2003 | Lantin |
| 2003/0118223 A1 | 6/2003 | Rahn et al. |
| 2003/0137525 A1 | 7/2003 | Smith |
| 2003/0151625 A1 | 8/2003 | Shoemaker |
| 2003/0151626 A1 | 8/2003 | Komar et al. |
| 2003/0174146 A1 | 9/2003 | Kenoyer |
| 2003/0179198 A1 | 9/2003 | Uchiyama |
| 2003/0179219 A1 | 9/2003 | Nakano et al. |
| 2003/0179237 A1 | 9/2003 | Nelson et al. |
| 2003/0196114 A1 | 10/2003 | Brew et al. |
| 2003/0210281 A1 | 11/2003 | Ellis et al. |
| 2003/0227556 A1 | 12/2003 | Doyle |
| 2003/0231177 A1 | 12/2003 | Montagnese et al. |
| 2004/0026521 A1 | 2/2004 | Colas et al. |
| 2004/0056869 A1 | 3/2004 | Jetha et al. |
| 2004/0056898 A1 | 3/2004 | Jetha et al. |
| 2004/0111332 A1 | 6/2004 | Baar et al. |
| 2004/0125138 A1 * | 7/2004 | Jetha et al. ............ 345/764 |
| 2004/0150664 A1 | 8/2004 | Baudisch |
| 2004/0194014 A1 | 9/2004 | Anwar |
| 2004/0217979 A1 | 11/2004 | Baar et al. |
| 2004/0240709 A1 | 12/2004 | Shoemaker |
| 2004/0257375 A1 | 12/2004 | Cowperthwaite |
| 2004/0257380 A1 | 12/2004 | Herbert et al. |
| 2005/0041046 A1 | 2/2005 | Baar et al. |
| 2005/0134610 A1 | 6/2005 | Doyle et al. |
| 2005/0259118 A1 | 11/2005 | Mojaver et al. |
| 2005/0278378 A1 | 12/2005 | Frank |
| 2005/0285861 A1 | 12/2005 | Fraser |
| 2006/0022955 A1 | 2/2006 | Kennedy |
| 2006/0026521 A1 | 2/2006 | Hotelling et al. |
| 2006/0033762 A1 * | 2/2006 | Card et al. ............ 345/660 |
| 2006/0036629 A1 | 2/2006 | Gray |
| 2006/0059432 A1 | 3/2006 | Bells |
| 2006/0082901 A1 | 4/2006 | Shoemaker |
| 2006/0098028 A1 | 5/2006 | Baar |
| 2006/0139375 A1 | 6/2006 | Rasmussen et al. |
| 2006/0192780 A1 | 8/2006 | Lantin |
| 2006/0214951 A1 | 9/2006 | Baar et al. |
| 2007/0033543 A1 | 2/2007 | Ngari et al. |
| 2007/0064018 A1 | 3/2007 | Shoemaker et al. |
| 2007/0097109 A1 | 5/2007 | Shoemaker et al. |
| 2009/0141044 A1 | 6/2009 | Shoemaker |
| 2009/0147023 A1 | 6/2009 | Jetha et al. |
| 2009/0172587 A1 | 7/2009 | Carlisle |
| 2009/0265656 A1 | 10/2009 | Jetha |
| 2009/0284542 A1 | 11/2009 | Baar |
| 2010/0026718 A1 | 2/2010 | Jetha |
| 2010/0033503 A1 | 2/2010 | Baar |
| 2010/0201785 A1 | 8/2010 | Lantin |
| 2010/0208968 A1 | 8/2010 | Shoemaker et al. |
| 2010/0262907 A1 | 10/2010 | Shoemaker et al. |

FOREIGN PATENT DOCUMENTS

| | | |
|---|---|---|
| CA | 2386560 | 11/2003 |
| CA | 2393708 | 1/2004 |
| CA | 2394119 | 1/2004 |
| EP | 0635779 | 1/1995 |
| EP | 0650144 | 4/1995 |
| EP | 0816983 | 7/1998 |
| JP | 4410465 | 2/2010 |

OTHER PUBLICATIONS

"Final Office Action", U.S. Appl. No. 11/673,038, (Jan. 8, 2010), 33 pages.

"Advisory Action", U.S. Appl. No. 11/541,778, (Feb. 1, 2010), 3 pages.

"Advisory Action", U.S. Appl. No. 11/935,222, (Feb. 4, 2010), 3 pages.

"Restriction Requirement", U.S. Appl. No. 12/368,263, (Mar. 9, 2010), 7 pages.

"Notice of Allowance", U.S. Appl. No. 10/705,199, (Mar. 10, 2010),18 pages.

"Non Final Office Action", U.S. Appl. No. 11/691,686, (Mar. 18, 2010),17 pages.

Robertson, et al., ""The Document Lens"", (1993),pp. 101-108.

Carpendale, Marianne Sheelagh T., ""A Framework for Elastic Presentation Space"", Simon Fraser University, Burnaby; British Columbia XP001051168, application ifugres 2.13, 3.1-3.31, 4.1-4.19, 5.14,(1999),pp. 7, 14, 34, 38, 65, 112, 123, and 126.

"Non Final OA", U.S. Appl. No. 11/935,222, (Feb. 20, 2009),12 pages.

Carpendale, M.S.T et al., ""A Framework for Unifying Presentation Space"", *01UIST. Proceedings of the 14th Annual ACM Symposium on User Interface Software and Technology, Proceedings of UIST '01: ACM Symposium on User Interface Software and Technology*, Orlando, FL, USA, XP002249323 2001, New York, NY, USA, ISBN: 1-58113-438-X,(Nov. 14, 2001),pp. 61-70; p. 64.

Ikedo, T ""A Realtime Video-Image Mapping User Polygon Rendering Techniques"", *IEEE Intl. conf* on Ottawa, Ont, Canada Jun. 3-6, 1997, Los Alamitos, CA, USA; *IEEE Comput. Soc*, US, XP010239181, ISBN: 0-8186-7819-4 Sections 2, 4.4; Multimedia Computing and Systems '97 Proceedings,pp. 127-134.

Bouju, A. et al., ""Client-Server Architecture for Accessing Multimedia and Geographic Databases within Embedded Systems"", *Database and Expert Systems Applications, 1999 Proceedings. Tenth International Workshop* on Florence, Italy Sep. 1-3, 1999, Los Alamitos, CA, USA, *IEEE Comput. Soc*, US, XP010352370; ISBN:0-7695-0281-4, abstract, figure 2,pp. 760-764.

Robertson, G et al., "The Document Lens", *UIST. Proceedings of the Annual ACM Symposium on User Interface Software and Technology.* abstract figures 3,4,(Nov. 3, 1993),pp. 101-108.

Dursteler, Juan C., "The digital magazine of InfoVis.net", Retrieved from: http://www.infovis.net/printMag.php?num=85&lang=2; (Apr. 22, 2002).

"Presentation for CGDI Workshop", Retrieved from: http://www.geoconnections.org/developersCorner/devCorner_devNetwork/meetings/2002.05.30/IDELIX_CGDI_20020530_dist.pdf, (May 2002).

Kuederle, Oliver ""Presentation of Image Sequences: A Detail-in-Context Approach"", *Thesis*, Simon Fraser University; (Aug. 2000),pp. 1-3, 5-10, 29-31.

Microsoft Corp., "Microsoft Paint", Microsoft Corp.,(1981-1998), Paint 1-14.

"Electronic Magnifying Glasses", *IBM Technical Disclosure Bulletin, IBM Corp.*, New York, US, vol. 37, No. 3; XP000441501, ISSN: 0018-8689 the whole document; (Mar. 1, 1994),pp. 353-354.

Keahey, T. A., ""The Generalized Detail-in-Context Problem"", *Information Visualization 1998, Proceedings; IEEE Symposium on Research Triangle*, CA, USA; Los Alamitos, CA, USA, *IEEE Comput. Soc*, US; XP010313304; ISBN: 0-8186-9093,(Oct. 19-20, 1998),pp. 44-51, 152.

Carpendale, et al., ""3-Dimensional Pliable Surfaces: For the Effective Presentation of Visual Information"", *Proceedings of the 8th annual ACM symposium on User interface and software technology*; (Dec. 1995).

Carpendale, M S T et al., ""Extending distortion viewing from 2D to 3D"", *IEEE Computer Graphics and Applications, IEEE Inc.* New York, US, vol. 17, No. 4; XP000927815, ISSN: 0272-1716. (Jul. 1997),pp. 42-51.

Viega, J et al., ""3D magic lenses"", *Proceedings of the 9th annual ACM symposium on User interface software and technology*; Pub 1996 ACM Press New York, NY, USA; (1996),51-58.

Cowperthwaite, David J., ""Occlusion Resolution Operators for Three-Dimensional Detail-in-Context"", Burnaby, British Columbia: Simon Fraser University; (2000).

Carpendale, M.S.T. ""A Framework for Elastic Presentation Space"", *Thesis* Simon Fraser University, XP001051168; Chapter 3-5; appendix A,B; (Mar. 1999),pp. 1-271.

Carpendale, M.S.T. et al., ""Exploring Distinct Aspects of the Distortion Viewing Paradigm"", *Technical Report TR 97-08, School of Computer Science*, Simon Fraser University, Burnaby, British Columbia, Canada; (Sep. 1997).

Cowperthwaite, David J., et al., ""Visual Access for 3D Data"", *in Proceedings of ACM CHI 96 Conference on Human Factors in Computer Systems*, vol. 2 of Short Papers: Alternative Methods of Interaction; (1996),pp. 175-176.

Keahey, T. A., ""Visualization of High-Dimensional Clusters Using NonLinear Magnification"", *Technical Report LA-UR-98-2776*, Los Alamos National Laboratory; (1998).

Tigges, M. et al., ""Generalized Distance Metrics for Implicit Surface Modeling"", *Proceedings of the Tenth Western Computer Graphics Symposium*; (Mar. 1999).

Bossen, F. J., ""Anisotropic Mesh Generation With Particles"", *Technical Report CMU-CS-96-134, CS Dept*, Carnegie Mellon University; (May 1996).

Bossen, F. J., et al., ""A Pliant Method for Anisotropic Mesh Generation"", *5th Intl. Meshing Roundtable*; (Oct. 1996),pp. 63-74.

Wilson, et al., ""Direct Volume Rendering Via 3D Textures"", *Technical Report UCSC-CRL-94-19*, University of California, Santa Cruz, Jack Baskin School of Engineering; (Jun. 1994).

Carpendale, M.S.T. "A Framework for Elastic Presentation Space", *PhD thesis*, Simon Fraser University; (1999),pp. 69, 72, 78-83,98-100, 240, and 241.

Keahey, T. A., et al., ""Techniques for Non-Linear Magnification Transformations"", *Information Visualization '96, Proceedings IEEE Symposium on*, San Francisco, CA, Los Alamitos, CA, USA, *IEEE Comput. Soc*, US: XP010201943; ISBN: 0-8186-7668-X the whole document,(Oct. 28, 1996),pp. 38-45.

Carpendale, M. Sheelagh T., et al., ""3-Dimensional Pliable Surfaces: For the Effective Presentation of Visual Information"", *UIST '95, 8th Annual Symposium on User Interface Software and Technology, Proceedings of the ACM Symposium on User Interface Software and Technology*, Pittsburgh, PA, *ACM Symposium on User Interface Software and Technology*, New York, (Nov. 14-17, 1995),pp. 217-226.

Keahey, T. A., ""Getting Along: Composition of Visualization Paradigms"", *Visual Insights, Inc.*; (2001).

Sakamoto, Chikara et al., ""Design and Implementation of a Parallel Pthread Library (PPL) with Parallelism and Portability"", *Systems and Computers* in Japan, New York, US, vol. 29, No. 2; XP000752780, ISSN: 0882-1666 abstract,(Feb. 1, 1998),pp. 28-35.

Deng, K. et al., ""Texture Mapping with a Jacobian-Based Spatially-Variant Filter",", *Proceedings 10th Pacific Conference on Computer Graphics and Applications*, Beijing, China, 2002 Los Alamitos, CA, USA, *IEEE Compt. Soc*, USA; XP00224932, ISBN: 0-7695-1784-6 the whole document,(Oct. 9-11, 2002),pp. 460-461.

Welsh, Michelle "Futurewave Software", *Business Wire*; (Nov. 15, 1993).

Fitzmaurice, G. et al., ""Tracking Menus"", *UIST*; (2003),pp. 71-79.

Stone, et al., "The movable filter as a user interface tool", *Proceedings of CHI ACM*; (1992),pp. 306-312.

Baudisch, P. et al., ""Halo: a Technique for Visualizing Off-Screen Locations"", *CHI*; (Apr. 5-10, 2003).

Baudisch, P. et al., ""Drag-And-Pop: Techniques for Accessing Remote Screen Content on Touch-And-Pen-Operated Systems"", *Interact '03*, (2003).

Carpendale, M.S.T. et al., ""Making Distortions Comprehensible"", *Visual Languages, Proceedings, 1997 IEEE Symposium* on Isle of Capri, Italy, Sep. 23-26, 1997, Los Alamitos, CA, USA, *IEEE Comput. Soc*., US, XP010250566, ISBN: 0-8186-8144-6,pp. 36-56.

Ito, Minoru et al., ""A Three-Level Checkerboard Pattern (TCP) Projection Method for Curved Surface Measurement"", *Pattern Recognition, Pergamon Press Inc*., Elmsford, N.Y., US vol. 28, No. 1; XP004014030, ISSN 0031-3203,(1995),pp. 27-40.

Keahey, T A., et al., ""Nonlinear Magnification Fields"", *Information Visualization, 1997, Proceedings, IEEE Symposium* on Phoenix, AZ, USA, Los Alamitos, CA, USA, *IEEE Comput. Soc*., US; XP010257169; ISBN: 0-8186-8189-6,(Oct. 20-21, 1997),pp. 51-58 and 121.

Rauschenbach, U. ""The Rectangular Fish Eye View as an Efficient Method for the Transmission and Display of Large Images"", *Image*

Processing, ICIP 99, Proceedings, 1999 International Conference, on, Kobe, Japan, Oct. 24-28, 1999, Piscataway, NJ, USA, IEEE, US, XP010368852, ISBN 0-7803-5467-2 p. 115, left-hand column-p. 116, paragraph 3, p. 118, paragraph 7.1; (1999),pp. 115-119.

Sheelagh, M. et al., ""Distortion Viewing Techniques for 3-Dimensional Data"", *Information Visualization '96, Proceedings IEEE Symposium* on San Francisco, CA, USA, Los Alamitos, CA, USA, IEEE Comput. Soc, US; XP010201944; ISBN: 0-8186-7668-X,(Oct. 28-29, 1996),pp. 46-43, 119.

Leung, Y. K., et al., ""A Review and Taxonomy of Distortion-Oriented Presentation Techniques"", *ACM Transactions on Computer-Human Interaction, 'Online!* vol. 1, No. 2, XP00252314; Retrieved from the Internet: <URL:http://citeseer.nj.nec.com/ leung94review. html> 'retrieved on Aug. 21, 2003! the whole document,(Jun. 1994),pp. 126-160.

"Non Final Office Action", U.S. Appl. No. 10/358,394, (Mar. 13, 2009).

Sarkar, et al., "Stretching the Rubber Sheet: A Metaphor for Viewing Large Layouts on Small Screens", *Proc. of the 6th annual ACM symp. on User interface software an technology*, Atlanta, GA, (Dec. 1993),p. 81-91.

Carpendale, M.S.T. "A Framework for Elastic Presentation Space", http://pages.cpsc.ucalgary.ca/~sheelagh/personal/thesis/, (Nov. 19, 1999).

"Non Final Office Action", U.S. Appl. No. 11/542,120, (Jan. 22, 2009),20 pages.

"Non-Final Office Action", U.S. Appl. No. 11/410,024, (Mar. 11, 2009),35 pages.

"Notice of Allowance", U.S. Appl. No. 11/401,349, (Apr. 17, 2009),35 pages.

Schmalstieg, Dieter et al., "Using transparent props for interaction with the virtual table", U.S. Appl. No. 11/410,024, Proceedings of the 1999 symposium on Interactive 3D graphics.,(Apr. 26, 1999),8 pages.

"Final Office Action", U.S. Appl. No. 10/705,199, (May 12, 2009),46 pages.

"Non Final Office Action", U.S. Appl. No. 11/541,778, (Jun. 19, 2009),36 pages.

"Non Final Office Action", U.S. Appl. No. 11/673,038, (Jul. 13, 2009),45 pages.

"Non Final Office Action", U.S. Appl. No. 11/410,024, (Jul. 20, 2009),27 pages.

Smith, et al., "Efficient techniques for wide-angle stereo vision using surface projection models", Retrieved from <http://ieee.org/stamp.jsp?arnumber=17045,(1999),6 pages.

"Non Final Office Action", U.S. Appl. No. 11/159,205, (Jul. 27, 2009),28 pages.

"Advisory Action", U.S. Appl. No. 11/249,493, (Aug. 11, 2009),5 pages.

"Advisory Action", U.S. Appl. No. 10/705,199, (Aug. 18, 2009),5 pages.

"Restriction Requirement", U.S. Appl. No. 11/935,222, (Aug. 20, 2009),6 pages.

"Advisory Action", U.S. Appl. No. 11/249,493, (Sep. 14, 2009),4 pages.

"Non-Final Office Action", U.S. Appl. No. 12/364,450, (Sep. 30, 2009),10 pages.

"Notice of Allowance", U.S. Appl. No. 10/358,394, (Oct. 8, 2009),8 pages.

"Final Office Action", U.S. Appl. No. 11/935,222, (Nov. 24, 2009), 8 pages.

"Final Office Action", U.S. Appl. No. 11/541,778, (Dec. 4, 2009), 12 pages.

"Notice of Allowance", U.S. Appl. No. 11/214,886, (Dec. 15, 2009), 16 pages.

Tominski, Christian et al., "Fisheye Tree Views and Lenses for Graph Visualization, Proceedings of the conference on Information Visualization, 2006", *Proceedings of the conference on Information Visualization*, 2006—U.S. Appl. No. 10/989,070 on Oct. 4, 2007, pp. 1-8.

Lamar, Eric et al., "A Magnification Lens for Interactive Volume Visualization", *Ninth Pacific Conference on Computer Graphics and Applications (PG'01)*, 2001; U.S. Appl. No. 11/104,571 on Mar. 22, 2007, (Oct. 2001),pp. 1-11.

Keahey, T. A., et al., "Nonlinear Magnification Fields", *Information Visualization, 1997, Proceedings, IEEE Symposium* on Phoenix, AZ, USA, Los Alamitos, CA, USA, *IEEE Comput. Soc.*, US; XP010257169; ISBN: 0-8186-8189-6,(Oct. 1997),pp. 51-58 and 121.

Watt, et al., "The Theory and Practice of Parametric Representation Techniques", *Advanced Animation and Rendering Techniques, Addison-Wesley*, Oct. 1992, p. 106-108.

Boots, Barry N., "Delaunay Triangles: An Alternative Approach to Point Pattern Analysis", *Proceedings of the Association of American Geographers*, vol. 6, (1974),pp. 26-29.

Carpendale, M. Sheelagh T., et al., "Graph Folding: Extending Detail and Context Viewing into a Tool for Subgraph Comparisons", in F. J. Brandenburg, editor, GD'95; Book Title: "Proceedings of the Symposium on Graph Drawing", *Lecture Notes in Computer Science 1027, Springer-Verlag*, Berlin, 1995, (1995), pp. 127-139.

"Foreign Office Action", Application No. 2002-536993, (Mar. 11, 2009), 4 pages.

"Non Final Office Action", U.S. Appl. No. 12/764,724, (Jul. 1, 2010), 20 pages.

"Non Final Office Action", U.S. Appl. No. 11/673,038, (Jul. 22, 2010), 39 pages.

"Final Office Action", U.S. Appl. No. 11/691,686, (Sep. 1, 2010), 16 pages.

"Non Final Office Action", U.S. Appl. No. 11/138,979, (Sep. 17, 2010), 11 pages.

"Non Final Office Action", U.S. Appl. No. 11/541,778, (Sep. 29, 2010), 10 pages.

"Non Final Office Action", U.S. Appl. No. 11/695,104, (Oct. 1, 2010), 9 pages.

"Final Office Action", U.S. Appl. No. 11/159,205, (Oct. 6, 2010), 16 pages.

"Non Final Office Action", U.S. Appl. No. 11/236,694, (Oct. 13, 2010), 16 pages.

Lieberman, Henry "Power of Ten Thousand—Navigating in Large Information Spaces", *Proceedings of the 7th annual ACM symposium on User interface software and technology*, Marina del Rey, California, United States, (Nov. 1994), pp. 15-16.

Mills, Michael et al., "A Magnifier Tool for Video Data", *Proceedings of the SIGCHI conference on Human factors in computing systems*, (1992), pp. 93-96.

Kline, Richard L., et al., "Improving GUI Accessibility for People with Low Vision", *Proceedings of the SIGCHI conference on Human factors in computing systems*, (1995), pp. 114-121.

Perlin, Ken et al., "Pad—an alternative approach to the computer interface", *International Conference on Computer Graphics and Interactive Techniques. Proceedings of the 20th annual conference on Computer graphics and interactive techniques.*, (1993), pp. 57-64.

Bier, Eric A., et al., "The Movable Filter as a User Interface Tool—The Video", *Conference on Human Factors in Computing Systems Conference companion on Human factors in computing systems*, (1995), pp. 413-414.

Bier, Eric A., et al., "Toolglass and Magic Lenses—The See-Through Interface", *International Conference on Computer Graphics and Interactive Techniques Proceedings of the 20th annual conference on Computer graphics and interactive techniques*, (1993), pp. 73-80.

Bier, Eric A., et al., "Toolglass and Magic Lenses—The See-Through Interface", *Conference on Human Factors in Computing Systems Conference companion on Human factors in computing systems*, (1994), pp. 445-446.

Kamba, Tomonari et al., "Using Small Screen Space More Efficiently", *CHI 96 Vancouver, BC Canada*, (1996), pp. 383-390.

"Final Office Action", U.S. Appl. No. 12/368,263, (Nov. 5, 2010), 7 pages.

"Final Office Action", U.S. Appl. No. 12/764,724, (Nov. 9, 2010), 21 pages.

"Advisory Action", U.S. Appl. No. 11/673,038, (Mar. 25, 2010), 3 pages.

"Final Office Action", U.S. Appl. No. 11/159,205, (Mar. 25, 2010), 16 pages.

"Notice of Allowance", U.S. Appl. No. 12/364,450, (Apr. 19, 2010), 4 pages.

"Non-Final Office Action", U.S. Appl. No. 11/236,694, (Apr. 20, 2010), 9 pages.

"Non Final Office Action", U.S. Appl. No. 12/368,263, (Apr. 30, 2010), 8 pages.

"Non Final Office Action", U.S. Appl. No. 12/368,267, (Jun. 11, 2010), 12 pages.

"Notice of Allowability", U.S. Appl. No. 12/364,450, (Jun. 18, 2010), 2 pages.

"Final Office Action", U.S. Appl. No. 11/691,686, (Nov. 22, 2010), 16 pages.

\* cited by examiner

NAVIGATING DIGITAL IMAGES USING DETAIL-IN-CONTEXT LENSES

RELATED APPLICATIONS

This application claims priority under 35 U.S.C. §120 as a continuation of U.S. application Ser. No. 10/989,070 (U.S. Pat. No. 7,495,678), filed Nov. 16, 2004, which claims priority to Canadian Application No. 2,449,888, filed Nov. 17, 2003, the entire disclosures of which are hereby incorporated by reference.

BACKGROUND

Computer graphics systems are typically used to examine and perform operations on large, detailed, digital images. Examples of such tasks include an artist editing a high-resolution image for print publication, an image analyst examining an aerial photograph, and a silicon chip designer examining chip layouts. Often, users of such graphics systems may desire to zoom-in to specific regions of a particular image in order to recognize detail. When zoomed-in to a specific region of interest, the entire image may not fit on the display screen of the system and hence a large portion of the image may no longer be visible to the user. If the user, still zoomed-in, wants to navigate to a different region of the image, the user typically first zoom-outs and then zooms back in, or pans repeatedly until the new region of interest is located. Both of these operations are slow and time consuming. Thus, conventional methods of navigating large images such as panning and zooming may be inefficient. This is an example of what has been referred to as the "screen real estate problem".

U.S. Pat. No. 6,271,854 to Light discloses a method for navigating in three-dimensional graphic scenes. In Light, a user may zoom-in to an object in a scene by clicking on the object. To zoom-out to the original scene, an "opportunistic" control icon is provided. By clicking on this control, the original scene is redisplayed. The user may then select another object in the original scene to zoom-in on. However, the screen real estate problem remains evident in Light. When viewing an object which has been zoomed-in, the relationship between that object and other objects in the original scene may be lost to the user.

SUMMARY

According to an embodiment, there is provided a method for navigating a computer generated original image presented on a display screen, comprising: displaying a first region of the original image; distorting the original image to produce a presentation having a distorted region for the first region and displaying the presentation; receiving a signal from a user to select a second region of the original image through the presentation; and, displaying the second region. The presentation may have a distorted region for the second region. The distorted region may include a focal region and/or a shoulder region.

The distorted regions provide the user with detailed information for the first and second regions of the original image. Each distorted region includes a focal region for displaying a portion of the first and second regions, respectively. The focal region may be a point. The first region, the second region, each focal region, and the presentation are displayed at respective predetermined scales. The scales of the first region, the second region, and each focal region may be greater than the scale of the presentation. The scales of the first region, the second region, and each focal region may be approximately equal. However, these scales may also be user selectable. In an implementation, the step of displaying the presentation includes zooming-out to the scale of the presentation from the scale of the first region. In an implementation, the step of displaying the second region includes zooming-in to the scale of the second region from the scale of the presentation. In an implementation, the zooming-out is progressive. The zooming-out may also be interactive. In an implementation, the zooming-in is progressive. The zooming-in may also be interactive. In an implementation, the scale of the focal region remains constant during the zooming-out. In an implementation, the scale of the focal region remains constant during the zooming-in. In an implementation, the distorting includes: establishing a lens surface for the distorted region; and, transforming the original image by applying a distortion function defining the lens surface to the original image. In an implementation, the transforming includes projecting the presentation onto a plane. In an implementation, the signal includes a location for the lens surface within the original image. In an implementation, the lens surface includes a direction for a perspective projection for the lens surface. In an implementation, the establishing further includes displaying a graphical user interface ("GUI") over the distorted region for adjusting the lens surface by the user with an input device. In an implementation, the lens surface includes a focal region and a shoulder region and the GUI includes at least one of: at least one icon for adjusting the lens surface; a slide bar icon for adjusting a magnification for the lens surface; a bounding rectangle icon with at least one handle icon for adjusting a size and a shape for the focal region; a bounding rectangle icon with at least one handle icon for adjusting a size and a shape for the shoulder region; a move icon for adjusting a location for the lens surface within the original image; a pickup icon for adjusting a location for the shoulder region within the original image; and, a fold icon for adjusting a location for the focal region relative to the shoulder region. In an implementation, the lens surface is a fisheye lens surface. In an implementation, the original image is a multi-dimensional image.

According to an embodiment, there is provided a method for navigating a computer generated original image presented on a display, comprising: displaying an original image; receiving a signal from a user to select a region of the original image; distorting the original image to produce a presentation having a distorted region for the region of the original image and displaying the presentation; and, displaying the region of the original image.

In an implementation, the distorted region provides the user with detailed information for the region of the original image selected by the user. In an implementation, the distorted region includes a focal region for displaying a portion of the region of the original image. According to another aspect, there is provided a method for navigating a computer generated original image presented on a display, comprising: displaying a region of an original image; receiving a signal from a user to select the original image; distorting the original image to produce a presentation having a distorted region for the region of the original image and displaying the presentation; and, displaying the original image. In an implementation, the distorted region provides the user with detailed information for the region of the original image. In an implementation, the distorted region includes a focal region for displaying a portion of the region of the original image.

BRIEF DESCRIPTION OF THE DRAWINGS

In the description and drawings, like numerals refer to like structures or processes.

DETAILED DESCRIPTION

Figure 1:
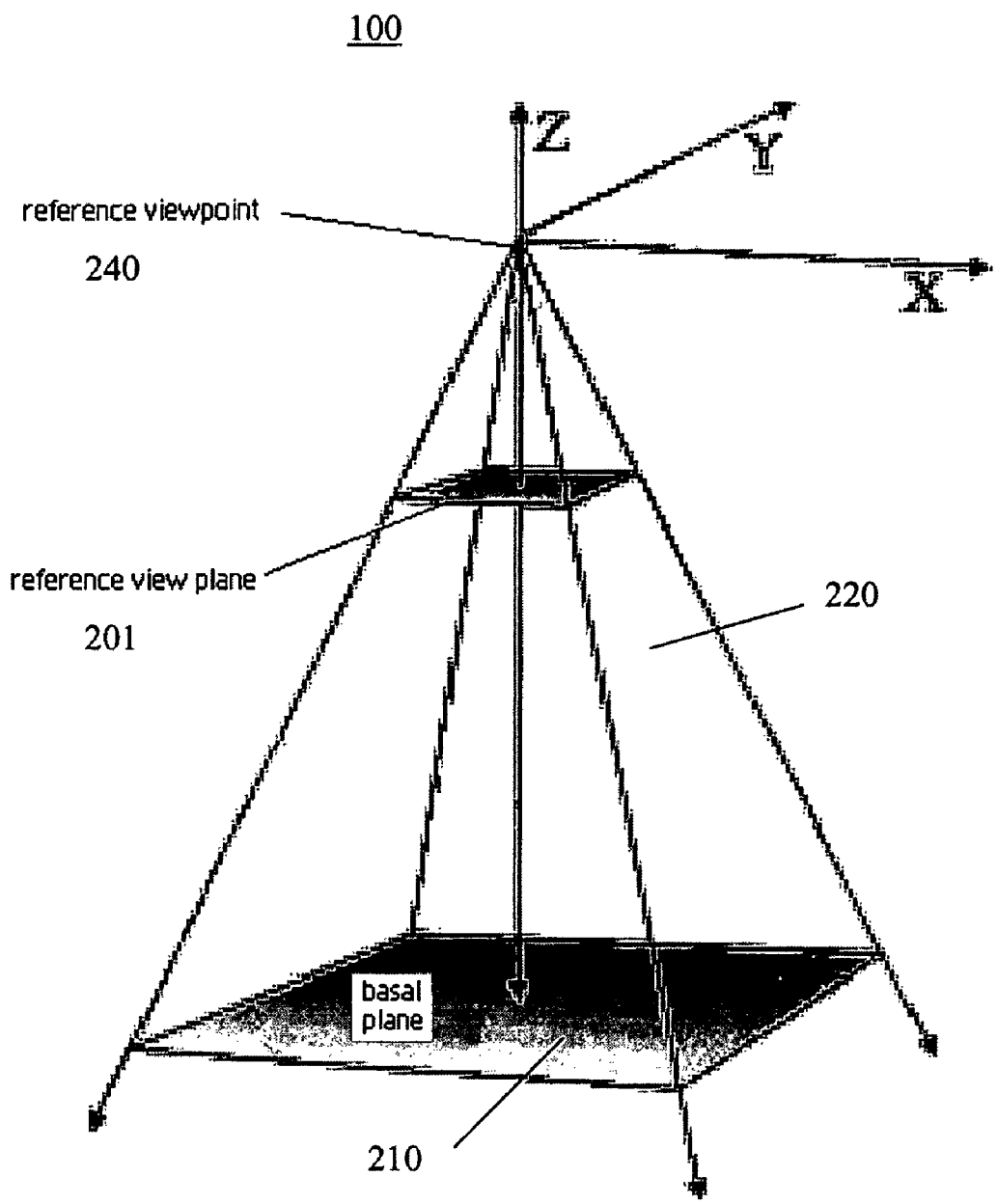
FIG. 1 is a graphical representation of the geometry for constructing a three-dimensional perspective viewing frustum, relative to an x, y, z coordinate system, in accordance with elastic presentation space graphics technology.

In the following description, numerous specific details are set forth to provide a thorough understanding. However, it is understood that the techniques described herein may be practiced without these specific details. The term "data processing system" is used herein to refer to any machine for processing data, including the computer systems and network arrangements described herein.

The "screen real estate problem" mentioned above generally arises whenever large amounts of information are to be displayed on a display screen of limited size. Conventional tools to address this problem include panning and zooming. While these tools are suitable for a large number of visual display applications, they become less effective where sections of the visual information are spatially related, such as in layered maps and three-dimensional representations, for example. In this type of information display, panning and zooming are not as effective as much of the context of the panned or zoomed display may be hidden.

A recent solution to this problem is the application of "detail-in-context" presentation techniques. Detail-in-context is the magnification of a particular region-of-interest (the "focal region" or "detail") in a data presentation while preserving visibility of the surrounding information (the "context"). This technique has applicability to the display of large surface area media (e.g. digital maps) on computer screens of variable size including graphics workstations, laptop computers, personal digital assistants ("PDAs"), and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation or image where the distortion is the result of the application of a "lens" like distortion function to the original representation. A detailed review of various detail-in-context presentation techniques such as "Elastic Presentation Space" ("EPS") (or "Pliable Display Technology" ("PDT")) may be found in a publication by Marianne S. T. Carpendale, entitled "A Framework for Elastic Presentation Space" (Carpendale, Marianne S. T., A Framework for Elastic Presentation Space (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e. the context), the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

FIG. 1 is a graphical representation 100 of the geometry for constructing a three-dimensional ("3D") perspective viewing frustum 220, relative to an x, y, z coordinate system, in accordance with elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
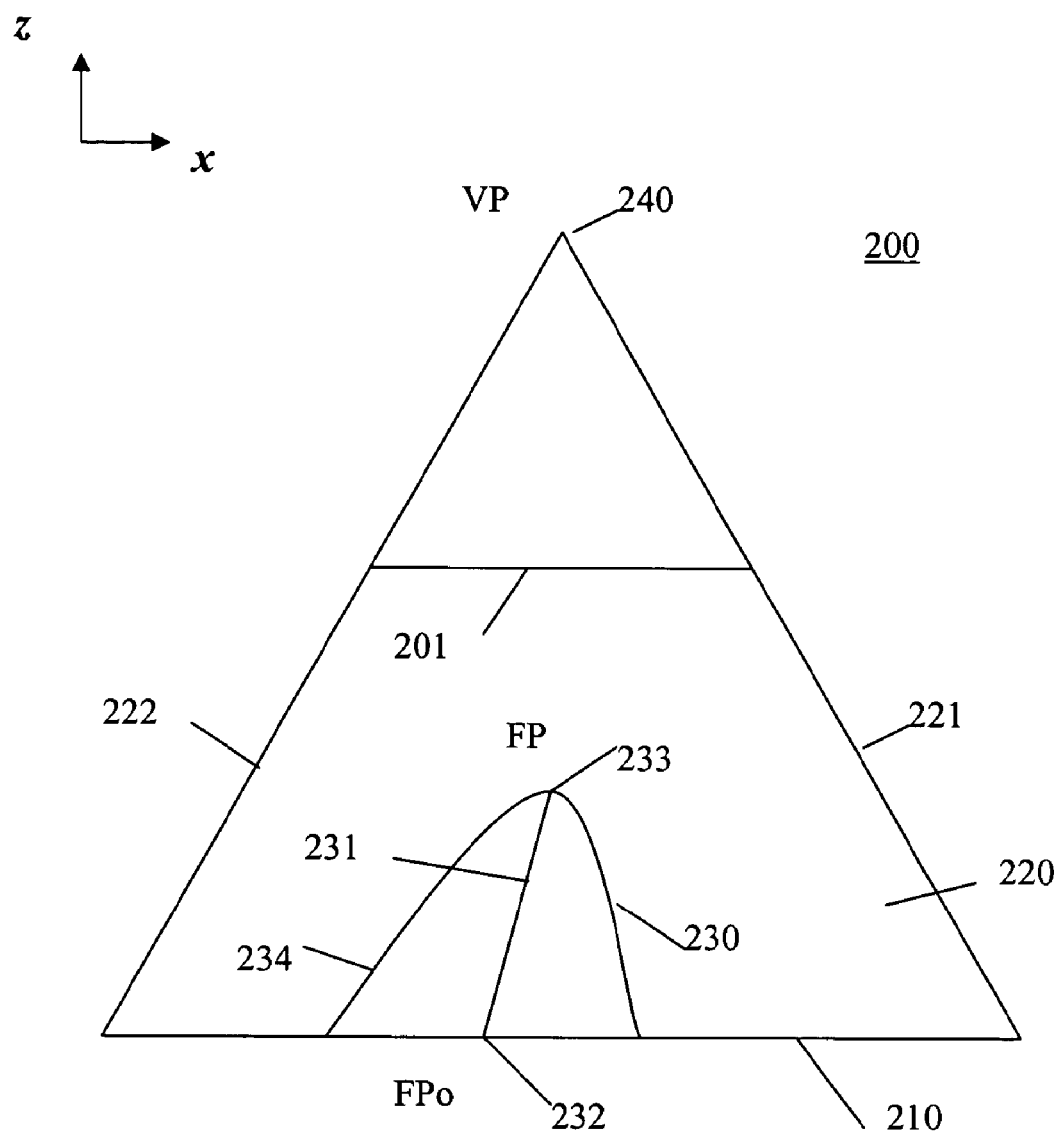
FIG. 2 is a graphical representation of the geometry of a presentation in accordance with elastic presentation space graphics technology.

FIG. 2 is a graphical representation 200 of the geometry of a presentation in accordance with EPS graphics technology. EPS graphics technology typically employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230. Typically, the perspective projection has a direction 231 that is viewer-aligned (i.e., the points FPo 232, FP 233, and VP 240 are collinear).

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e. the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2, in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions may include basic lens types with point and circular focal regions, as well as certain more complex lenses and advanced capabilities such as folding.

Figure 3:
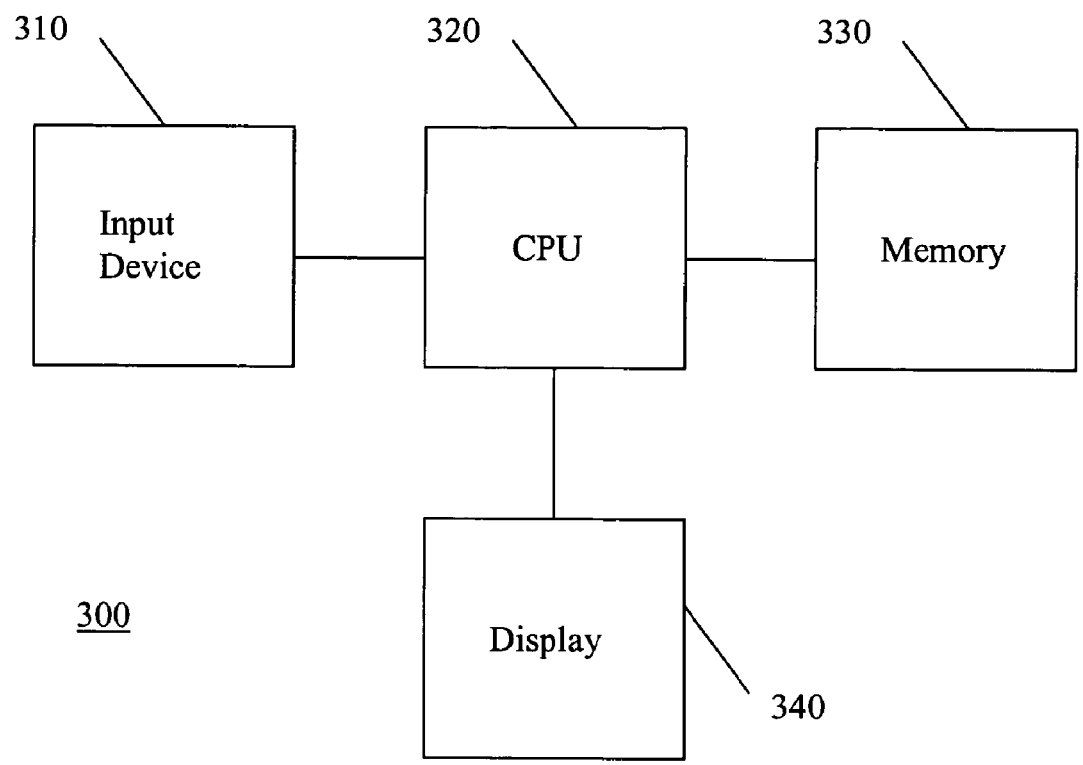
FIG. 3 is a block diagram illustrating a data processing system adapted for implementing an embodiment.

FIG. 3 is a block diagram of a data processing system 300 adapted to implement an embodiment. The data processing system 300 is suitable for implementing EPS technology, for displaying detail-in-context presentations of representations, and for navigating digital images in conjunction with a detail-in-context graphical user interface ("GUI") 400, as described below. The data processing system 300 includes an input device 310, a central processing unit ("CPU") 320, memory 330, and a display 340. The input device 310 may include a keyboard, mouse, trackball, or similar device. The CPU 320 may include dedicated coprocessors and memory devices. The memory 330 may include RAM, ROM, databases, or disk devices. And, the display 340 may include a computer screen, terminal device, or a hardcopy producing output device such as a printer or plotter. The data processing system 300 has stored therein data that may include sequences of instructions that if executed cause the method described herein to be performed. Of course, the data processing system 300 may contain additional software and hardware a description of which is not necessary for understanding the techniques.

As mentioned, detail-in-context presentations of data using techniques such as pliable surfaces are useful in presenting large amounts of information on limited-size display surfaces. Detail-in-context views allow magnification of a particular region-of-interest (the "focal region") 233 in a data presentation while preserving visibility of the surrounding information 210. In the following, a GUI 400 is described having lens control elements that can be implemented in software and applied to the editing of multi-layer images and to the control of detail-in-context data presentations. The software can be loaded into and run by the data processing system 300 of FIG. 3.

Figure 4:
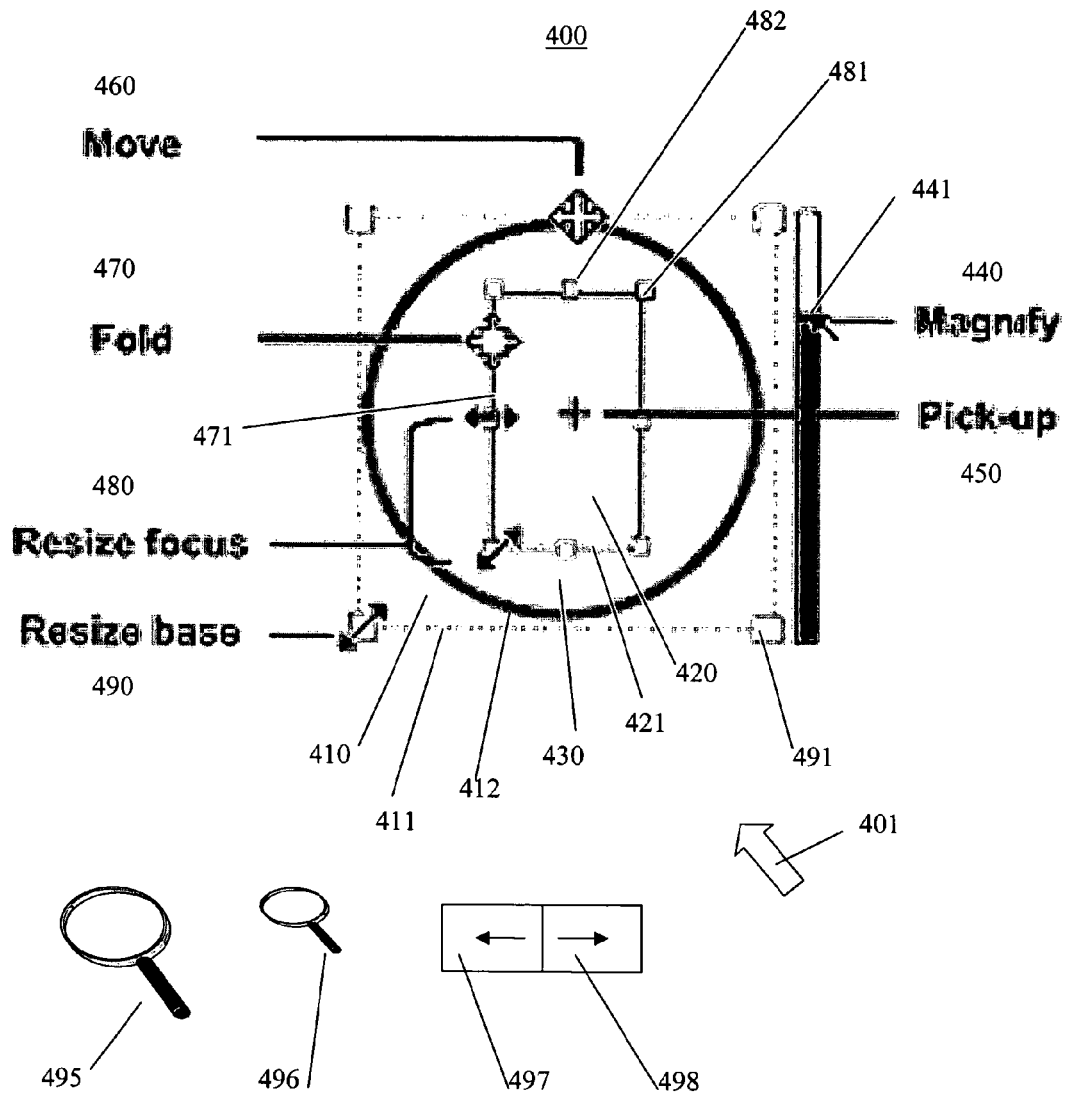
FIG. 4 a partial screen capture illustrating a GUI having lens control elements for user interaction with detail-in-context data presentations in accordance with an embodiment.

FIG. 4 is a partial screen capture illustrating a GUI 400 having lens control elements for user interaction with detail-in-context data presentations in accordance with an embodiment. Detail-in-context data presentations are characterized by magnification of areas of an image where detail is desired, in combination with compression of a restricted range of areas of the remaining information (i.e. the context), the end result typically giving the appearance of a lens having been applied to the display screen surface. This lens 410 includes a "focal region" 420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. As mentioned above, the base of the lens 412 may be coextensive with the focal region 420.

In general, the GUI 400 has lens control elements that, in combination, provide for the interactive control of the lens 410. The effective control of the characteristics of the lens 410 by a user (i.e. dynamic interaction with a detail-in-context lens) is advantageous. At any given time, one or more of these lens control elements may be made visible to the user on the display surface 340 by appearing as overlay icons on the lens 410. Interaction with each element is performed via the motion of an input or pointing device 310 (e.g. mouse), with the motion resulting in an appropriate change in the corresponding lens characteristic. As will be described, selection of which lens control element is actively controlled by the motion of the pointing device 310 at any given time is determined by the proximity of the icon representing the pointing device 310 (e.g. cursor) on the display surface 340 to the appropriate component of the lens 410. For example, "dragging" of the pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the techniques may be practiced with other 2D or 3D (or even greater numbers of dimensions) pointing devices including a trackball and keyboard.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, the disclosed techniques may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, magnify, zoom, and scoop. Each of these lens control elements has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491, 492 magnify slide bar icon 440, zoom icon 495, and scoop slide bar icon 1040 (see FIG. 10). Typically, these icons are displayed simultaneously after selection of the lens 410. In addition, when the cursor 401 is located within the extent of a selected lens 410, an alternate cursor icon 460, 470, 480, 490, 495 may be displayed over the lens 410 to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491, 492 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491, 492. Note that it is well within the scope of the described techniques to provide a bounding region having a shape other than generally rectangular. Such a bounding region could be of any of a number of shapes including oblong, oval, ovoid, conical, cubic, cylindrical, polyhedral, spherical, fisheye, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 492, 440, 1040. For example, when resizing the base 412 of a lens 410 using a corner handle 491, the cursor 401 will change form to a resize icon 490 once it is pointed at (i.e. positioned over) the corner handle 491. The cursor 401 may remain in the form of the resize icon 490 until the cursor 401 has been moved away from the corner handle 491.

Lateral movement of a lens 410 is provided by the move lens control element of the GUI 400. This functionality is accomplished by the user first selecting the lens 410, 610 through a point and click operation. Then, the user points to a point within the lens 410 that is other than a point lying on a lens control icon 450, 412, 411, 421, 481, 482, 491, 492 440, 1040. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resizing of the base 412 (or outline) of a lens 410 is provided by the resize base lens control element of the GUI. After the lens 410 is selected, a bounding rectangle icon 411 is displayed surrounding the base 412. For a rectangular shaped base 412, the bounding rectangle icon 411 may be coextensive with the perimeter of the base 412. The bounding rectangle 411 includes handles 491, 492. These handles 491, 492 can be used to stretch the base 412 taller or shorter, wider or narrower, or proportionally larger or smaller. The corner handles 491 will keep the proportions the same while changing the size. The middle handles 492 (see FIG. 10) will make the base 412 taller or shorter, wider or narrower. Resizing the base 412 by the corner handles 491 will keep the base 412 in proportion. Resizing the base 412 by the middle handles 492 will change the proportions of the base 412. That is, the middle handles 492 change the aspect ratio of the base 412 (i.e. the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a corner handle 491 may include arrows indicating proportional resizing. The resize icon (not shown) for a middle handle 492 may include arrows indicating width resizing or height resizing. After pointing at the desired handle 491, 492 the user would click and drag the handle 491, 492 until the desired shape and size for the base 412 is reached. Once the desired shape and size are reached, the user would release the mouse button 310. The base 412 of the lens 410 is then locked in its new size and shape until a further base resize operation is performed.

Resizing of the focal region 420 of a lens 410 is provided by the resize focus lens control element of the GUI. After the lens 410 is selected, a bounding rectangle icon 421 is displayed surrounding the focal region 420. For a rectangular shaped focal region 420, the bounding rectangle icon 421 may be coextensive with the perimeter of the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user may click and drag the handle 481, 482 until the desired shape and size for the focal region 420 is reached. Once the desired shape and size are reached, the user may release the mouse button 310. The focal region 420 is then locked in its new size and shape until a further focus resize operation is performed.

Folding of the focal region 420 of a lens 410 is provided by the fold control element of the GUI. In general, control of the degree and direction of folding (i.e. skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231. In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user may click on the point 471 and drag in the desired direction of folding. To control the degree of folding, the user may drag to a greater or lesser degree in the desired direction of folding. Once the desired direction and degree of folding is reached, the user would release the mouse button 310. The lens 410 is then locked with the selected fold until a further fold operation is performed.

Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed. In general, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Zoom functionality is provided by the zoom lens control element of the GUI. Referring to FIG. 2, the zoom lens control element, for example, allows a user to quickly navigate to a region of interest 233 within a continuous view of a larger presentation 210 and then zoom-in to that region of interest 233 for detailed viewing or editing. Referring to FIG. 4, the combined presentation area covered by the focal region 420 and shoulder region 430 and surrounded by the base 412 may be referred to as the "extent of the lens". Similarly, the presentation area covered by the focal region 420 may be referred to as the "extent of the focal region". The extent of the lens may be indicated to a user by a base bounding rectangle 411 when the lens 410 is selected. The extent of the lens may also be indicated by an arbitrarily shaped figure that bounds or is coincident with the perimeter of the base 412. Similarly, the extent of the focal region may be indicated by a second bounding rectangle 421 or arbitrarily shaped figure. The zoom lens control element allows a user to: (a) "zoom-in" to the extent of the focal region such that the extent of the focal region fills the display screen 340 (i.e. "zoom to focal region extent"); (b) "zoom-in" to the extent of the lens such that the extent of the lens fills the display screen 340 (i.e. "zoom to lens extent"); or, (c) "zoom-in" to the area lying outside of the extent of the focal region such that the area without the focal region is magnified to the same level as the extent of the focal region (i.e. "zoom to scale").

In particular, after the lens 410 is selected, a bounding rectangle icon 411 is displayed surrounding the base 412 and a bounding rectangle icon 421 is displayed surrounding the focal region 420. Zoom functionality is accomplished by the user first selecting the zoom icon 495 through a point and click operation When a user selects zoom functionality, a zoom cursor icon 496 may be displayed to replace the cursor 401 or may be displayed in combination with the cursor 401. The zoom cursor icon 496 provides the user with indications as to what zoom operations are possible. For example, the zoom cursor icon 496 may include a magnifying glass. By choosing a point within the extent of the focal region, within the extent of the lens, or without the extent of the lens, the user may control the zoom function. To zoom-in to the extent of the focal region such that the extent of the focal region fills the display screen 340 (i.e. "zoom to focal region extent"), the user would point and click within the extent of the focal region. To zoom-in to the extent of the lens such that the extent of the lens fills the display screen 340 (i.e. "zoom to lens extent"), the user would point and click within the extent of the lens. Or, to zoom-in to the presentation area without the extent of the focal region, such that the area without the extent of the focal region is magnified to the same level as the extent of the focal region (i.e. "zoom to scale"), the user would point and click without the extent of the lens. After the point and click operation is complete, the presentation is locked with the selected zoom until a further zoom operation is performed.

Alternatively, rather than choosing a point within the extent of the focal region, within the extent of the lens, or without the extent of the lens to select the zoom function, a zoom function menu with multiple items (not shown) or multiple zoom function icons (not shown) may be used for zoom function selection. The zoom function menu may be presented as a pull-down menu. The zoom function icons may be presented in a toolbar 650 or adjacent to the lens 410 when the lens is selected. Individual zoom function menu items or zoom function icons may be provided for each of the "zoom to focal region extent", "zoom to lens extent", and "zoom to scale" functions described above. In this alternative, after the lens 410 is selected, a bounding rectangle icon 411 may be displayed surrounding the base 412 and a bounding rectangle icon 421 may be displayed surrounding the focal region 420. Zoom functionality is accomplished by the user selecting a zoom function from the zoom function menu or via the zoom function icons using a point and click operation. In this way, a zoom function may be selected without considering the position of the cursor 401 within the lens 410.

The concavity or "scoop" of the shoulder region 430 of the lens 410 is provided by the scoop lens control element of the GUI. After the lens 410 is selected, the scoop control is presented to the user as a slide bar icon 1040 (see FIG. 10) near or adjacent to the lens 410 and typically below the lens 410. Sliding the bar 1041 of the slide bar 1040 results in a proportional change in the concavity or scoop of the shoulder region 430 of the lens 410. The slide bar 1040 not only informs the user that the shape of the shoulder region 430 of the lens 410 may be selected, but also provides the user with an indication as to what degree of shaping is possible. The slide bar 1040 includes a bar 1041 that may be slid left and right, or up and down, to adjust and indicate the degree of scooping. To control the degree of scooping, the user would click on the bar 1041 of the slide bar 1040 and drag in the direction of desired scooping degree. Once the desired degree of scooping is reached, the user would release the mouse button 310. The lens 410 is then locked with the selected scoop until a further scooping operation is performed.

Figure 6:
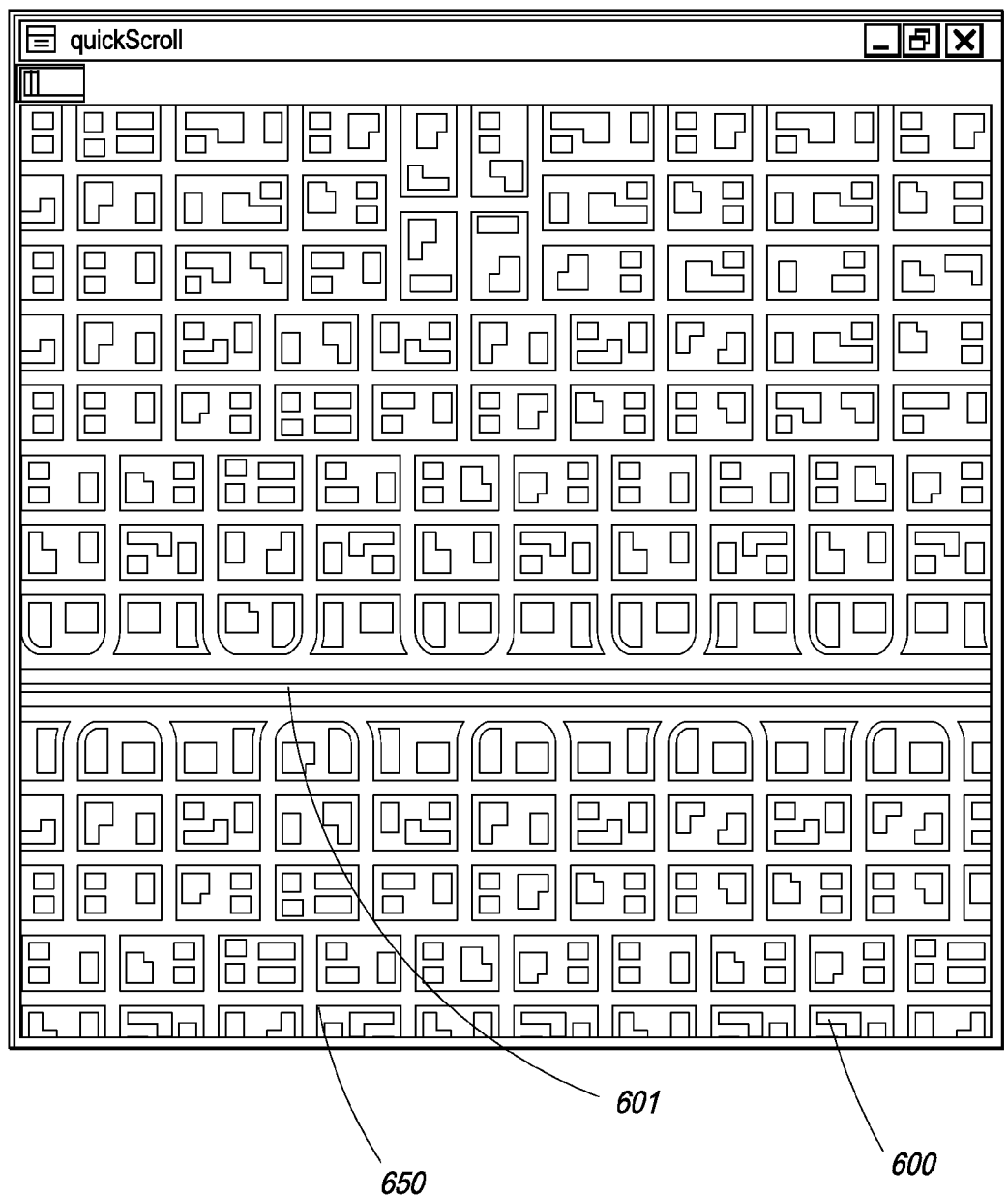
FIG. 6 is a screen capture illustrating a presentation of a first region of an original digital image or representation in accordance with an embodiment.

Advantageously, a user may choose to hide one or more lens control icons 450, 412, 411, 421, 481, 482, 491, 492, 440, 495, 1040 shown in FIGS. 4 and 6 from view so as not to impede the user's view of the image within the lens 410. This may be helpful, for example, during an editing or move operation. A user may select this option through means such as a menu, toolbar, or lens property dialog box.

In addition, the GUI 400 maintains a record of control element operations such that the user may restore pre-operation presentations. This record of operations may be accessed by or presented to the user through "Undo" and "Redo" icons 497, 498, through a pull-down operation history menu (not shown), or through a toolbar.

Thus, detail-in-context data viewing techniques allow a user to view multiple levels of detail or resolution on one display 340. The appearance of the data display or presentation is that of one or more virtual lenses showing detail 233 within the context of a larger area view 210. Using multiple lenses in detail-in-context data presentations may be used to compare two regions of interest at the same time. Folding enhances this comparison by allowing the user to pull the regions of interest closer together. Moreover, using detail-incontext technology such as PDT, an area of interest can be magnified to pixel level resolution, or to any level of detail available from the source information, for in-depth review. In accordance with the described techniques, detail-in-context lenses and fisheye rendering techniques are used to navigate large digital images. The digital images may include graphic images, maps, photographic images, or text documents, and the source information may be in raster, vector, or text form.

For example, in order to view a selected object or area in detail, a user can define a lens 410 over the object using the GUI 400. The lens 410 may be introduced to the original image to form the presentation through the use of a pull-down menu selection, tool bar icon, etc. Using lens control elements for the GUI 400, such as move, pickup, resize base, resize focus, fold, magnify, zoom, and scoop, as described above, the user adjusts the lens 410 for detailed viewing of the object or area. Using the magnify lens control element, for example, the user may magnify the focal region 420 of the lens 410 to pixel quality resolution revealing detailed information pertaining to the selected object or area. That is, a base image (i.e., the image outside the extent of the lens) is displayed at a low resolution while a lens image (i.e., the image within the extent of the lens) is displayed at a resolution based on a user selected magnification 440, 441.

In operation, the data processing system 300 may employ EPS techniques with an input device 310 and GUI 400 for selecting objects or areas for detailed display to a user on a display screen 340. Data representing an original image or representation is received by the CPU 320 of the data processing system 300. Using EPS techniques, the CPU 320 processes the data in accordance with instructions received from the user via an input device 310 and GUI 400 to produce a detail-in-context presentation. The presentation is presented to the user on a display screen 340. It will be understood that the CPU 320 may apply a transformation to the shoulder region 430 surrounding the region-of-interest 420 to affect blending or folding in accordance with EPS technology. For example, the transformation may map the region-of-interest 420 and/or shoulder region 430 to a predefined lens surface, defined by a transformation or distortion function and having a variety of shapes, using EPS techniques. Or, the lens 410 may be simply coextensive with the region-of-interest 420. (Blending and folding of lenses in detail-in-context presentations are described in United States Patent Application Publication No. 2002/0044154 which is incorporated herein by reference.)

The lens control elements of the GUI 400 are adjusted by the user via an input device 310 to control the characteristics of the lens 410 in the detail-in-context presentation. Using an input device 310 such as a mouse, a user adjusts parameters of the lens 410 using icons and scroll bars of the GUI 400 that are displayed over the lens 410 on the display screen 340. The user may also adjust parameters of the image of the full scene. Signals representing input device 310 movements and selections are transmitted to the CPU 320 of the data processing system 300 where they are translated into instructions for lens control.

Moreover, the lens 410 may be added to the presentation before or after the object or area is selected. That is, the user may first add a lens 410 to a presentation or the user may move a pre-existing lens into place over the selected object or area. The lens 410 may be introduced to the original image to form the presentation through the use of a pull-down menu selection, tool bar icon, etc.

Advantageously, by using a detail-in-context lens 410 to select an object or area for detailed information gathering, a user can view a large area (i.e., outside the extent of the lens 410) while focusing in on a smaller area (or within the focal region 420 of the lens 410) surrounding the selected object. This makes it possible for a user to accurately gather detailed information without losing visibility or context of the portion of the original image surrounding the selected object.

Figure 5:
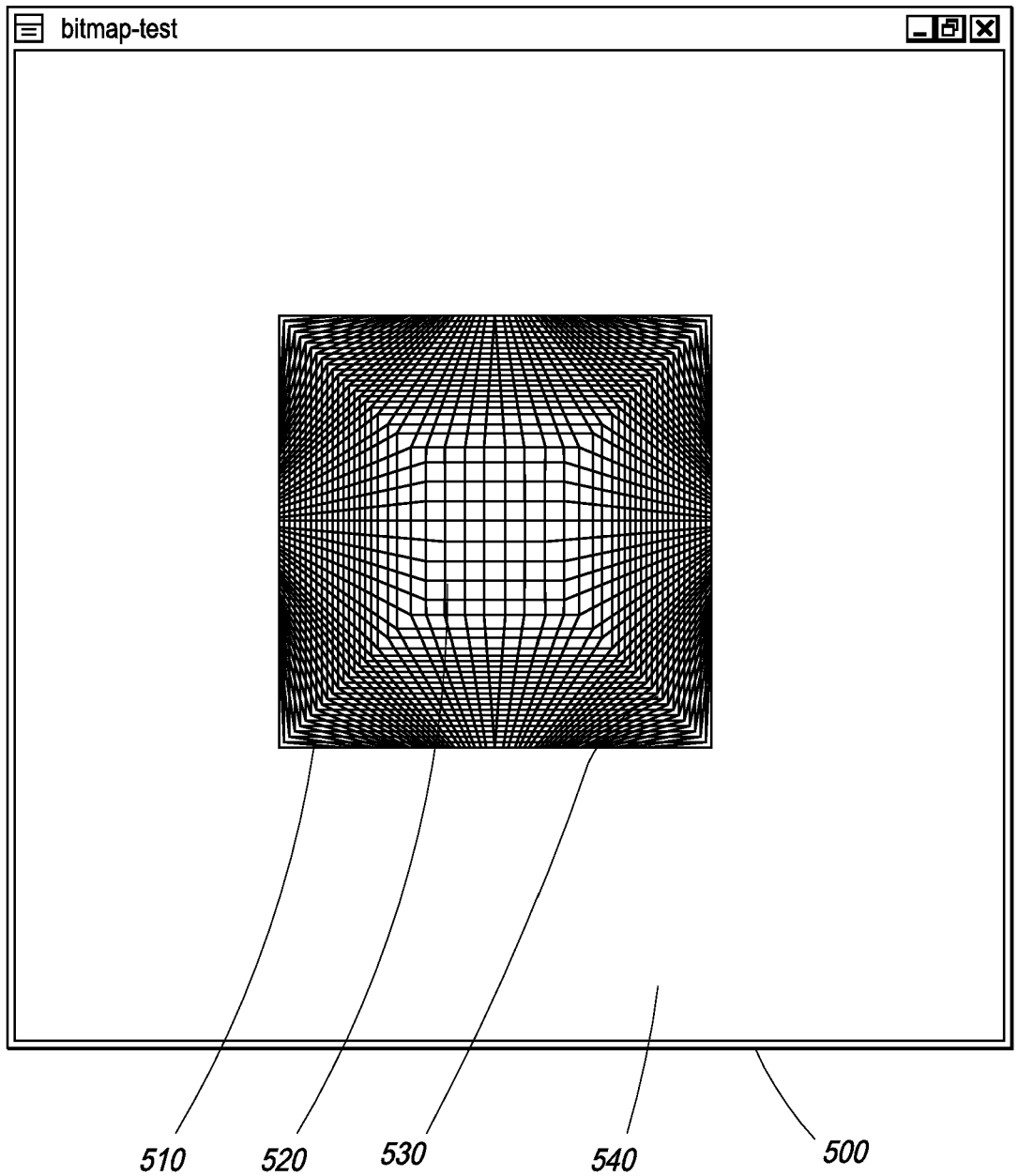
FIG. 5 is a screen capture illustrating a presentation having a detail-in-context fisheye lens in accordance with an embodiment.

FIG. 5 is a screen capture illustrating a presentation 500 having a detail-in-context fisheye lens 510 in accordance with an embodiment. The method of navigating large images of the described techniques employs the rendering technique of fisheye lens distortion as described above. This rendering technique allows a two-dimensional image to be warped or distorted, so that a region of interest 520 presented on a display screen 340 is magnified to a larger scale than the surrounding data 540. The large scale area 520 and small scale area 540 are joined by a continuously varying shoulder region 530 that maintains continuity of the data. An example of such a distorted space is shown in FIG. 5.

The navigation method of the described techniques uses a combination of zooming and fisheye distortion in order to facilitate navigation about a digital image, typically a large digital image, on a computer display screen 340. Several embodiments of the method are described in the following. According to one embodiment, the GUI 400 includes a navigation control element for implementing these alternatives. The navigation control element may include an associated navigation toolbar, pull-down menu, or pop-up dialog window or box (not shown) which may be displayed over or adjacent to the lens 410.

FIG. 6 is a screen capture illustrating a presentation 600 of a first region 601 of an original digital image or representation 650 in accordance with an embodiment. The digital image 650 shown in FIG. 6 is a digital map image. It often occurs that a user will be zoomed-in to a region 601 of an image 650 in order to work on their primary task, be it editing, analysis, or some other task. At some point the user may need to navigate to a different part of the image 650 that is not currently visible on the display 340. FIG. 6 shows the first region 601 before the navigation method of the described techniques begins.

Figure 7:
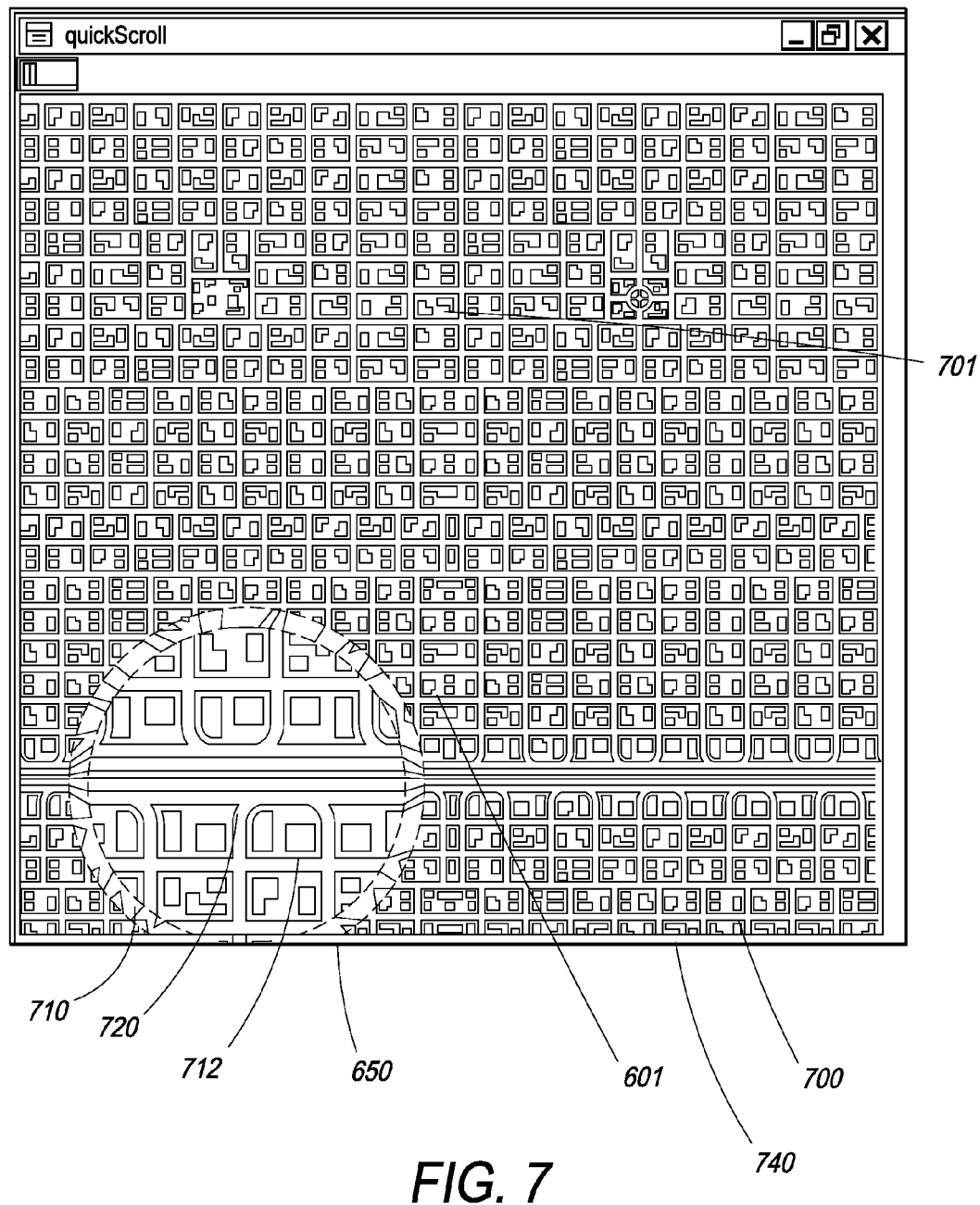
FIG. 7 is a screen capture illustrating a detail-in-context presentation, having a detail-in-context fisheye lens, for the original image in accordance with an embodiment.

FIG. 7 is a screen capture illustrating a detail-in-context presentation 700, having a detail-in-context fisheye lens 710, for the original image 650 in accordance with an embodiment. Upon activating the navigation control element by selecting within an associated navigation toolbar, pull-down menu, or pop-up dialog window or box (not shown), by pressing a key or key combination, by clicking a mouse button, or by performing a similar operation, the user indicates to the system 300 his/her desire to navigate to a different part of the original image 650. At this point, several steps are initiated. First, the view 600 of the first region 601 of the image 650 is zoomed-out so that a larger portion 700 of the original image 600 is visible. Once the zooming-out is completed, what is presented on the display screen 340 is shown in FIG. 7.

In an implementation, the zooming-out occurs in an animated fashion, with a plurality of animation frames smoothly linking the zoomed-in view 600 and zoomed-out view 700. According to one embodiment of this step, the image 600 is zoomed-out and repositioned so that it fits exactly in a window 740. According to another embodiment of this step, the image 600 is zoomed-out to a predetermined maximum scale. According to another embodiment of this step, as the image 600 is zoomed-out, a virtual point (e.g., 601) in the image under the cursor 401 will stay stationary under the cursor 401.

The next step is the presentation of a fisheye distortion lens 710 on the zoomed-out view 700. In an implementation, the content of the focal region 720 of the fisheye lens 710 is maintained at a constant scale as viewed on the display 340.

Accordingly, the magnification of the lens 710 may increase relative to regions outside of the lens as the zooming-out progresses. In an implementation, the size of the focal region 720 and the size of the lens bounds 712 remain constant as viewed on the display 340. According to one embodiment, the contents of the lens 710 remain unchanged as the zooming-out process progresses. Accordingly, the lens 710 may change position relative to its original position as viewed on the display 340. According to another embodiment, the lens 710 remains stationary as viewed on the display 340. Accordingly, the content of the lens 710 may change relative to its original content as the zooming-out progresses. According to another embodiment, as the lens 710 moves during zooming-out, the cursor 401 is directed to follow the center of the lens 710.

As shown in FIG. 7, the user is thus provided with a zoomed-out large scale view 700 of the original image 650, with a lens 710 showing detailed content for the first region 601, possibly at the scale of the original zoomed-in view 600. At this point the user can move the lens 710 around on the image 650 in order to locate a new region of interest 701. Moving of the lens 710 is typically performed by moving a mouse 310, with the lens 710 following the associated cursor 401, as described above.

Figure 8:
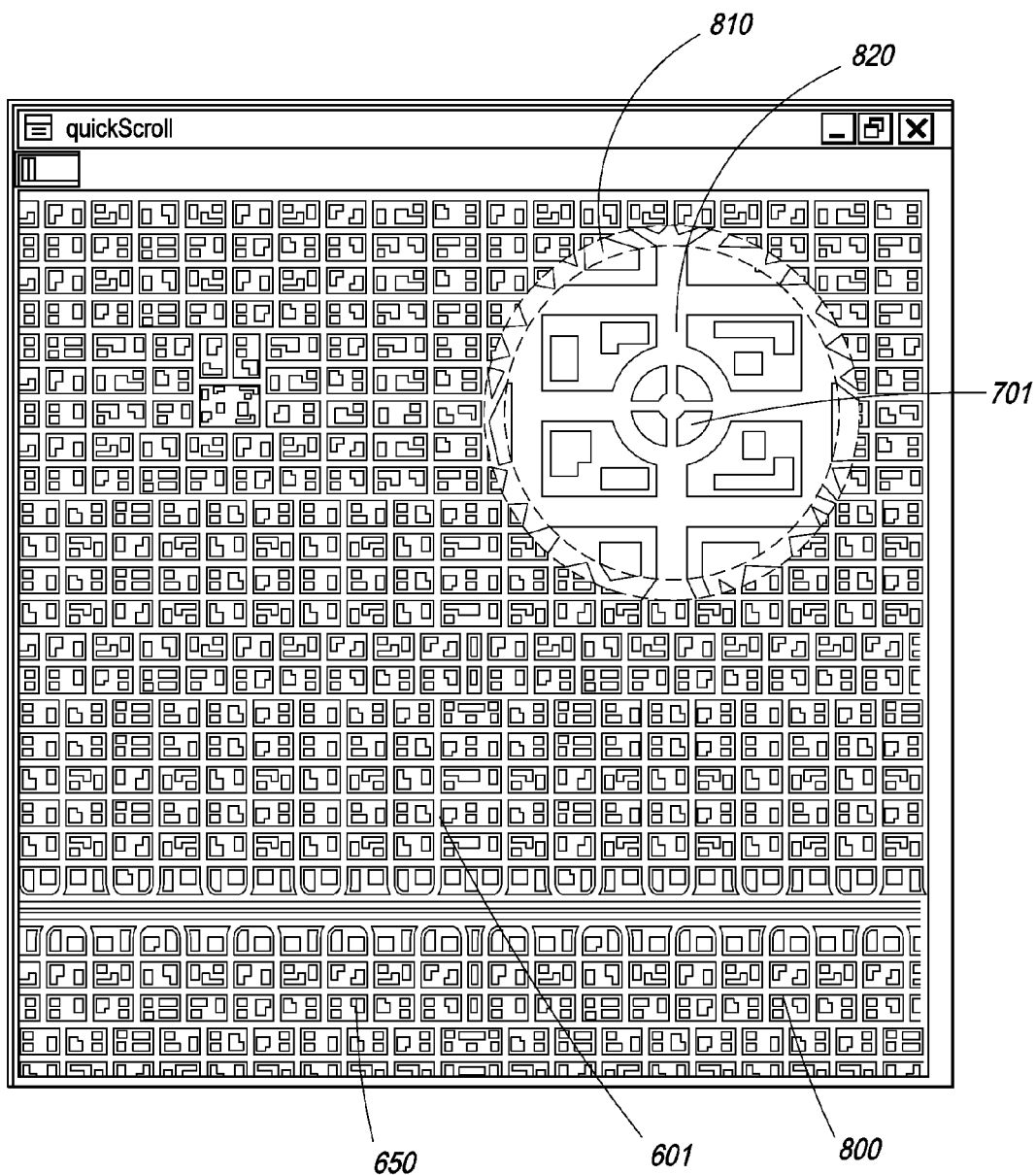
FIG. 8 is a screen capture illustrating a detail-in-context presentation having a relocated fisheye lens in accordance with an embodiment.

FIG. 8 is a screen capture illustrating a detail-in-context presentation 800 having a relocated fisheye lens 810 in accordance with an embodiment. Once the new region of interest 701 has been located by the user, and is presented in the center or focus 820 of the lens 810, the user performs another action (e.g., releasing a key or mouse button, pressing of another key or mouse button, etc.) to indicate to the system 300 that a zoomed-in view of the new region of interest 701 is to be presented. When this action is performed, several steps are initiated and performed, again preferably in an animated fashion. First, a virtual image point (e.g., 701) at the center or focus 820 of the lens 810 moves to the center of the display. Second, the image 800 is zoomed-in so that at the end of the zoom operation the magnification level is the same as it was at the beginning of the navigation operation (i.e., at the level of FIG. 6). Third, as the zooming-in occurs, the magnification level of the lens 810 decreases so that the visual scale in the focal region 820 stays constant, and ultimately, the lens 810 disappears from the presentation 800. Alternatively, the centering and zooming-in steps are performed simultaneously. Alternatively, the zooming-in may be performed interactively and may be stopped by the user at any time.

Figure 9:
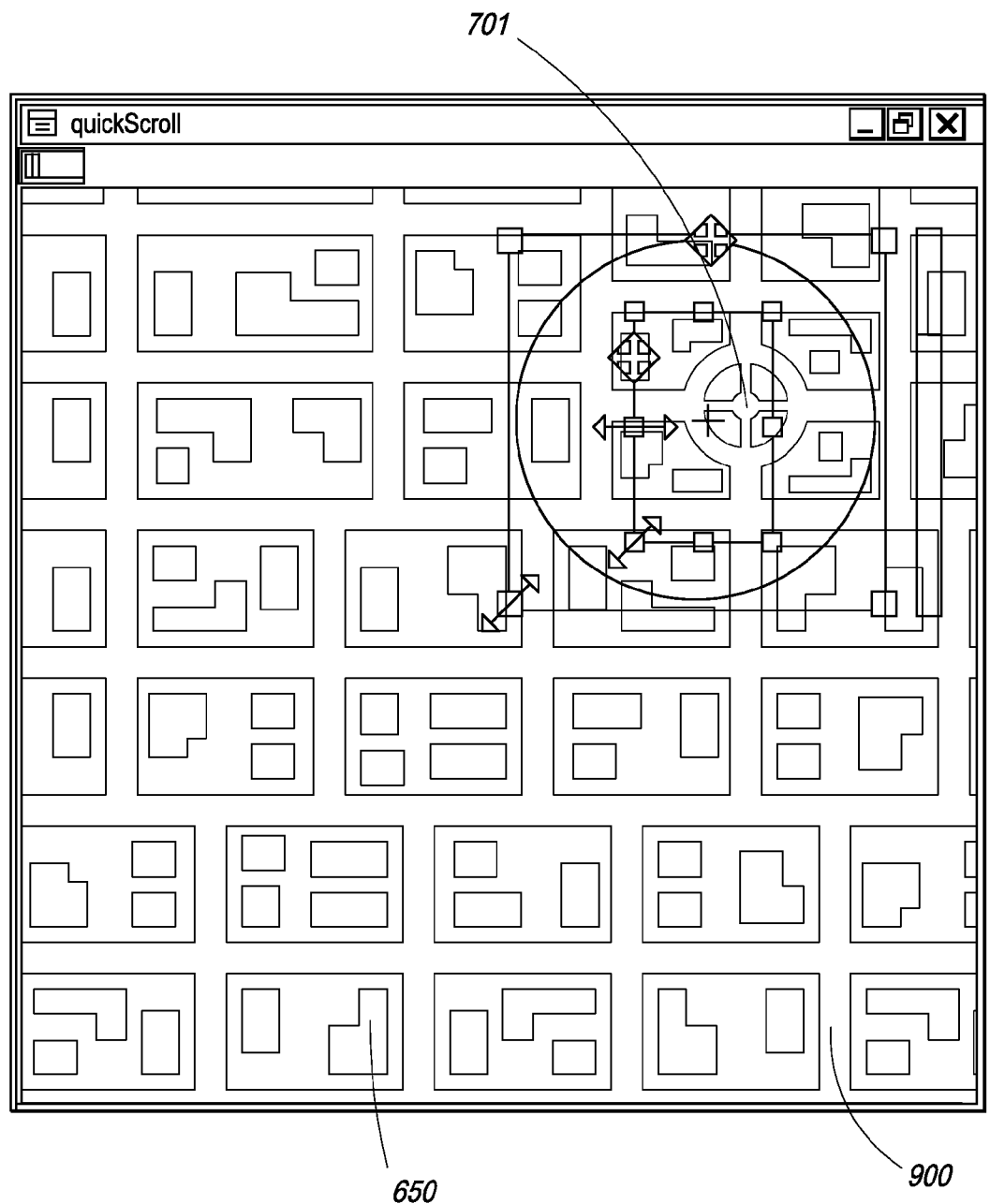
FIG. 9 is a screen capture illustrating a presentation of a second region of the original digital image or representation in accordance with an embodiment.

FIG. 9 is a screen capture illustrating a presentation 900 of a second region 701 of the original digital image or representation 650 in accordance with an embodiment. At this point the navigation operation has ended and the user is zoomed-in to a new region 701 in the original image 650 and is ready to continue with whatever task the user may wish to perform.

Figure 10:
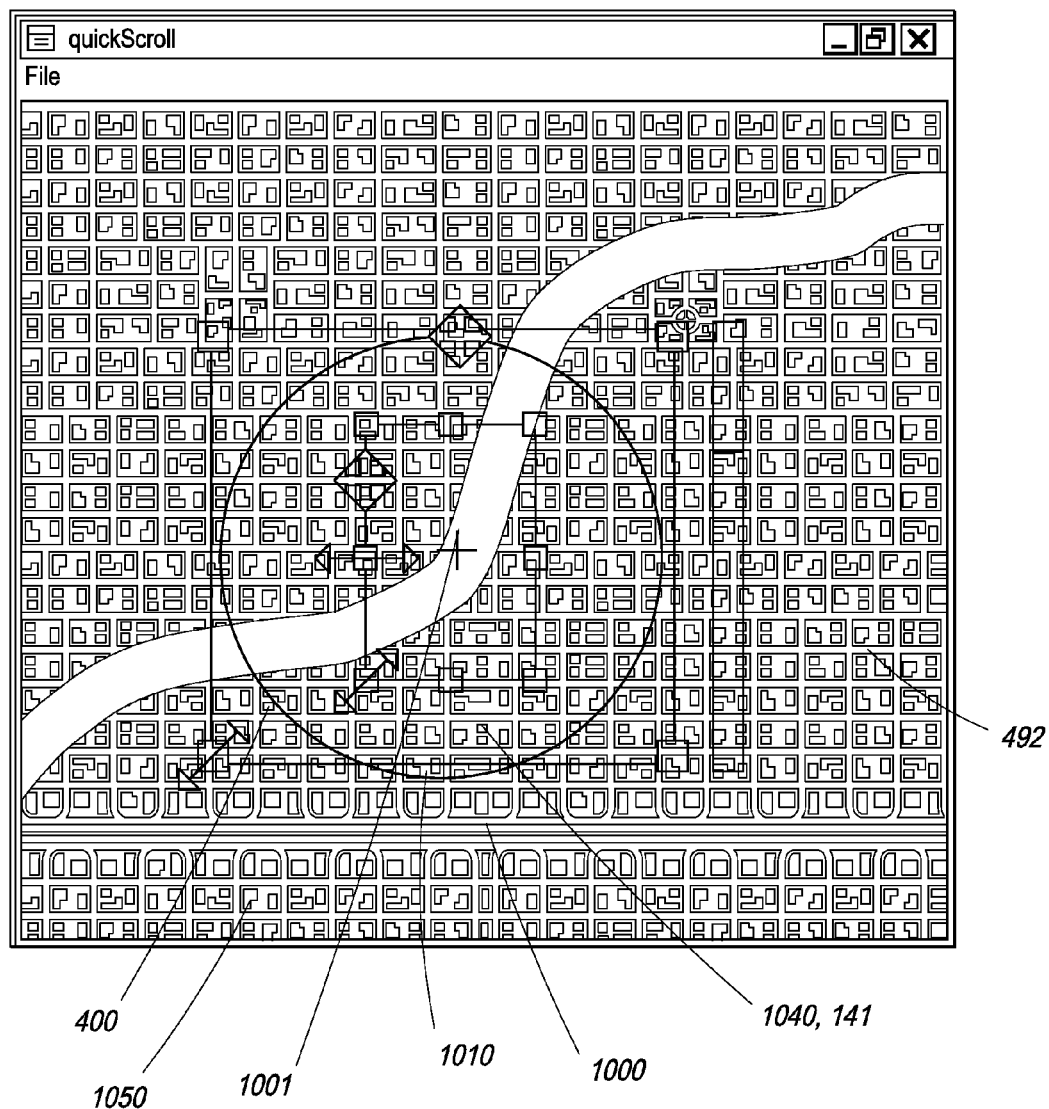
FIG. 10 is a screen capture illustrating a presentation having a detail-in-context lens and an associated GUI for an original digital image in accordance with an embodiment.

FIG. 10 is a screen capture illustrating a presentation 1000 having a detail-in-context lens 1010 and an associated GUI 400 for an original digital image 1050 in accordance with an alternate embodiment. The original digital image 1050 shown in FIG. 10 is again a digital map image. Now, consider a user whose primary task involves viewing the entire image or dataset 1050 and using the lens 1010 to view and perhaps manipulate the data.

Figure 11:
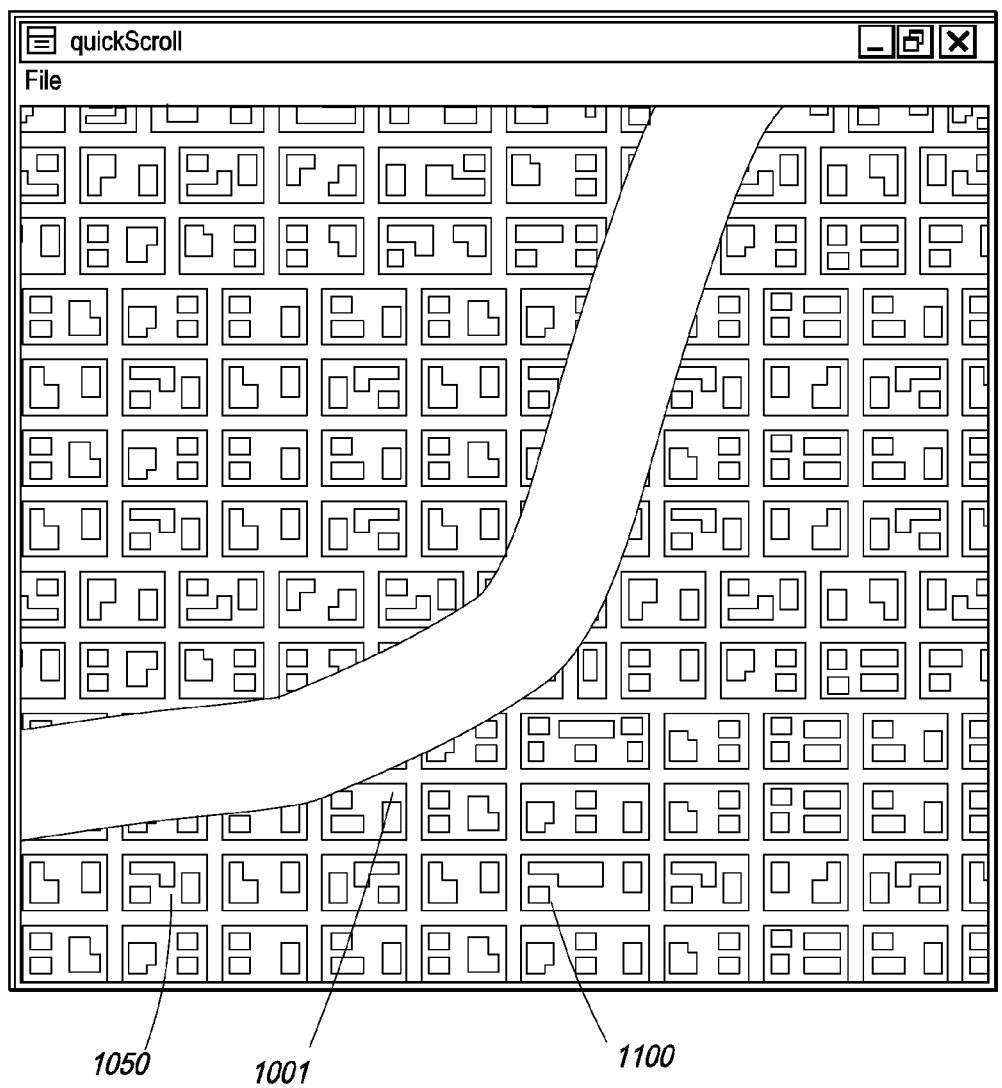
FIG. 11 is a screen capture illustrating a presentation of a first zoomed-in region of the original digital image in accordance with an embodiment.

FIG. 11 is a screen capture illustrating a presentation 1100 of a first zoomed-in region 1001 of the original digital image 1050 in accordance with an embodiment. The user may initiate an operation to zoom-in to a region of interest 1001 that has been identified by the lens 1010. Upon activating the navigation control element by selecting within an associated navigation toolbar, pull-down menu, or pop-up dialog window or box (not shown), by pressing a key or key combination, by clicking a mouse button, or by performing a similar operation, the user indicates to the system 300 his/her desire to change views of the original image 1050. As with the first embodiment described above, this change in view can be performed in an animated fashion to show the change and the relation between the two points of view. As the user zooms-in, the magnification of the lens 1010 is reduced relative to the regions outside the lens until the user is fully zoomed-in at which time the lens 1010 is not visible. Thus, in the zoomed-in view 1100, the lens 1010 is not presented and the scale of the data, once zoomed-in, is equal to the scale of the lens 1010 when zoomed-out (i.e., at the level of the lens 1010 shown in FIG. 10).

Figure 12:
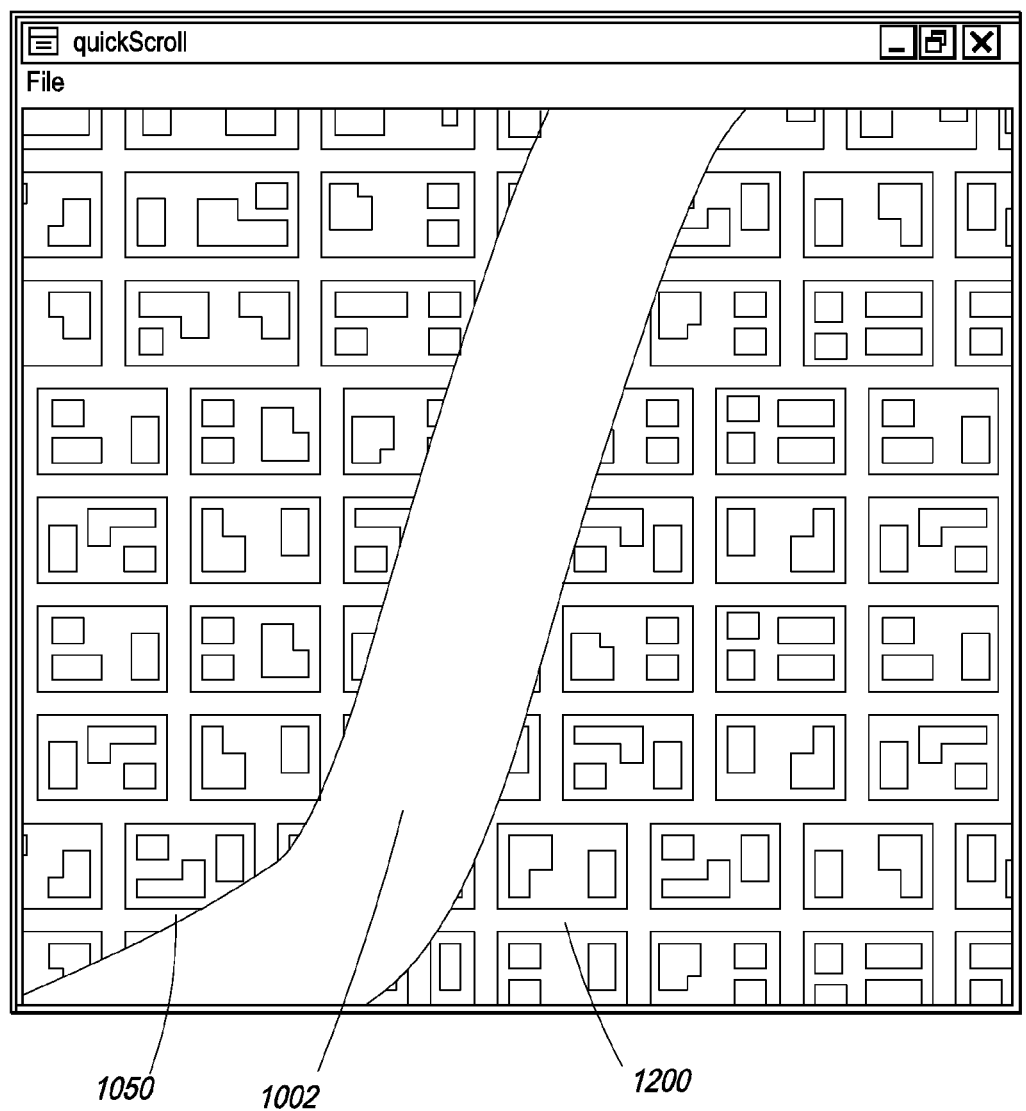
FIG. 12 is a screen capture illustrating a presentation of a second zoomed-in region of the original digital image in accordance with an embodiment.

FIG. 12 is a screen capture illustrating a presentation 1200 of a second zoomed-in region 1002 of the original digital image 1050 in accordance with an alternate embodiment. Once zoomed-in, the user can operate on the data including panning around the data at the current scale.

Figure 13:
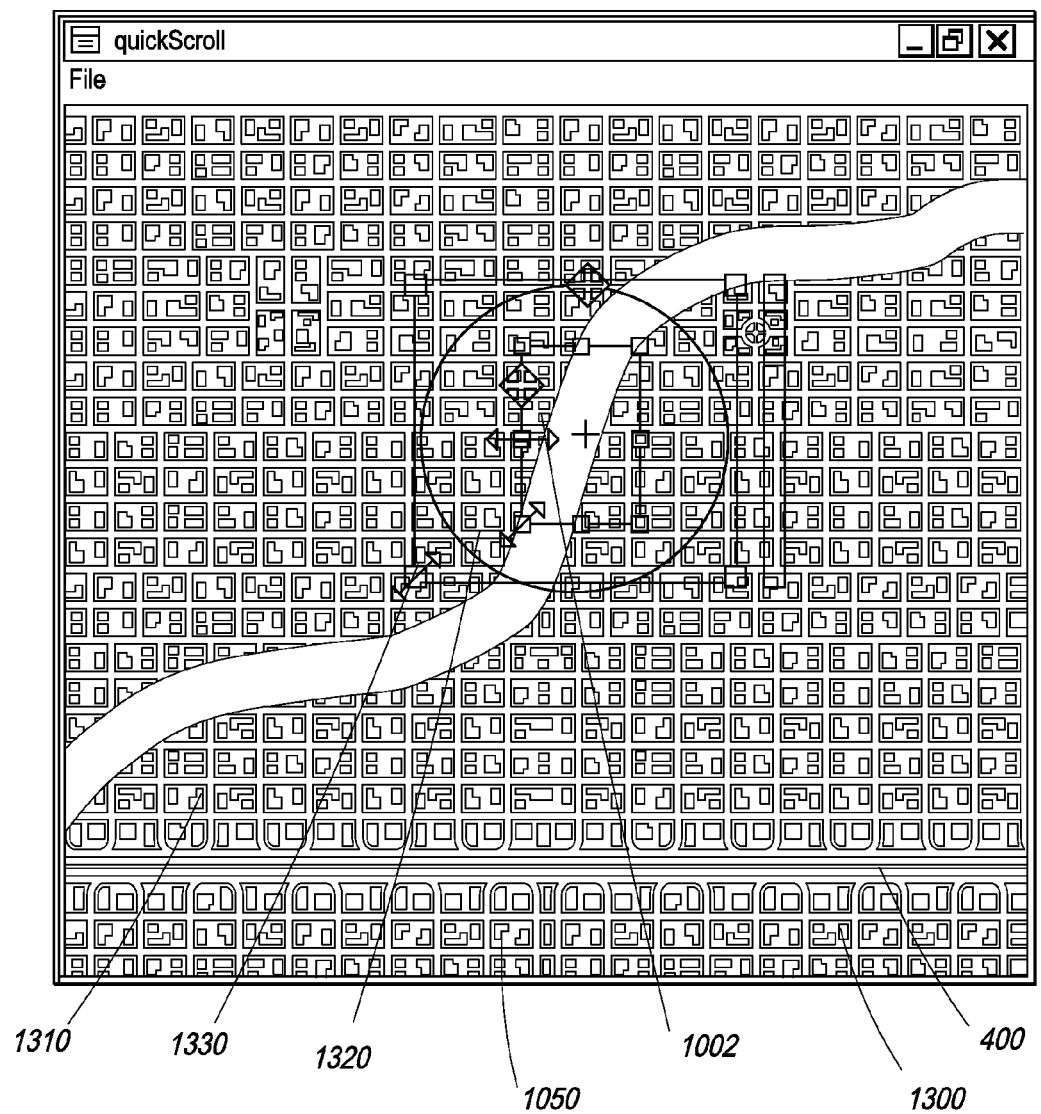
FIG. 13 is a screen capture illustrating a presentation having a relocated detail-in-context lens and an associated GUI for the second zoomed-in region of the original digital image in accordance with an embodiment.

FIG. 13 is a screen capture illustrating a presentation 1300 having a relocated detail-in-context lens 1310 and an associated GUI 400 for the second zoomed-in region 1002 of the original digital image 1050 in accordance with an embodiment. Upon activating the navigation control element by selecting within an associated navigation toolbar, pull-down menu, or pop-up dialog window or box (not shown), by pressing a key or key combination, by clicking a mouse button, or by performing a similar operation, the user indicates to the system 300 a desire to change views of the original image 1050. As with the first embodiment described above, this change in view can be performed in an animated fashion to show the change and the relation between the two points of view. In this zoom-out however, the current region of interest (i.e., what the user is currently viewing) 1002 is used to fill the lens 1310. The centre of the region of interest 1002 is placed at the centre of the lens 1310. A predetermined amount of the region of interest 1002 is used to fill the focal region 1320 of the lens 1310. And, the remaining amount of the region of interest 1002 is used to fill the shoulder 1330 of the lens 1310. Once the zoom-out is completed, as shown in FIG. 13, the user can control the lens 1310 using the GUI 400, as described above, and can operate on the data at the zoomed-out scale. Alternatively, the centering and zooming-out steps are performed simultaneously. Alternatively, the zooming-out may be performed interactively and may be stopped by the user at any time.

According to another embodiment, the zoom-in and zoom-out operations of the first and alternate embodiments described above can be taken one step further. After completing a zoom-in operation, the user is allowed to pan and create a new lens. Once the new lens is created, the process of zooming-in can be repeated. When the user zooms-out, he/she can delete the newly created lenses, or leave them, thus providing a pyramid-like presentation of lenses. At any point of the zoomed-in or zoomed-out levels, the user is allowed to pan the image and move the lens.

Figure 14:
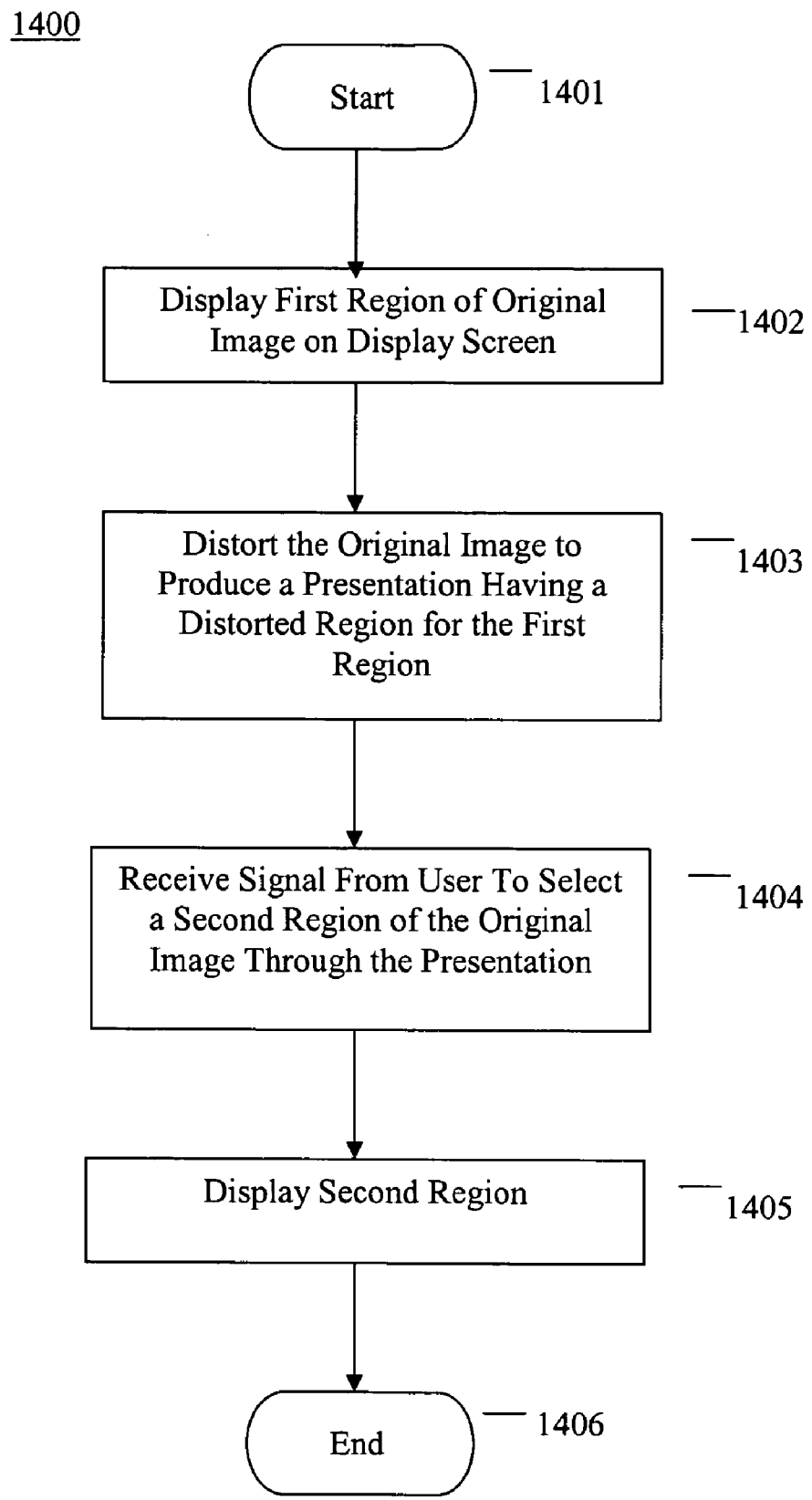
FIG. 14 is a flow chart illustrating a method for navigating a computer generated original image presented on a display screen in accordance with an embodiment.

FIG. 14 is a flow chart 1400 illustrating a method for navigating a computer generated original image 650 presented on a display screen 340 in accordance with an embodiment. At step 1401, the method starts.

At step 1402, a first region 601 of the original image 650 is displayed 600 on the display screen 340.

At step 1403, the original image 650 is distorted to produce a presentation 700 having a distorted region 710 for the first region 601 and the presentation 700 is displayed. In an implementation, the displaying of the presentation 700, 800 includes zooming-out to the scale of the presentation 700, 800 from the scale of the first region 601. In an implementation, the zooming-out is progressive. In an implementation, the scale of the focal region 720 remains constant during the zooming-out. In an implementation, the distorting 1403 includes: establishing a lens surface 230 for the distorted region 710, 810; and, transforming the original image 650 by applying a distortion function defining the lens surface 230 to the original image 650. In an implementation, the transforming includes projecting the presentation 700, 800 onto a plane 201. In an implementation, the signal includes a location for the lens surface 230 within the original image 650. In an implementation, the lens surface 230 includes a direction 231 for a perspective projection for the lens surface 230. In an implementation, the establishing further includes displaying a GUI 400 over the distorted region 710, 810 for adjusting the lens surface 230 by the user with an input device 310. In an implementation, the lens surface 230 includes a focal region 233 and a shoulder region 234 and the GUI 400 includes at least one of: a slide bar icon 440 for adjusting a magnification for the lens surface 230; a bounding rectangle icon 421 with at least one handle icon 481, 482 for adjusting a size and a shape for the focal region 233; a bounding rectangle icon 411 with at least one handle icon 491, 492 for adjusting a size and a shape for the shoulder region 234; a move icon 460 for adjusting a location for the lens surface 230 within the original image 650; a pickup icon 450 for adjusting a location for the shoulder region 234 within the original image 650; and, a fold icon 470 for adjusting a location for the focal region 233 relative to the shoulder region 234. In an implementation, the lens surface 230 is a fisheye lens surface 510. In an implementation, the original image 650 is a multi-dimensional image.

At step 1404, a signal is received from a user to select a second region 701 of the original image 650 through the presentation 700. In an implementation, the presentation 800 has a distorted region 810 for the second region 701. In an implementation, the distorted regions 710, 810 provide the user with detailed information for the first and second regions 601, 701 of the original image 650. In an implementation, each distorted region 710, 810 includes a focal region 720, 820 for displaying a portion of the first and second regions 601, 701 respectively.

At step 1405, the second region 701 is displayed 900. In an implementation, the first region 601, the second region 701, each focal region 720, 820, and the presentation 700, 800 are displayed at respective predetermined scales. In an implementation, the scales of the first region 601, the second region 701, and each focal region 720, 820 are greater than the scale of the presentation 700, 800. In an implementation, the scales of the first region 601, the second region 701, and each focal region 720, 820 are approximately equal. In an implementation, the step 1405 of displaying the second region 701 includes zooming-in to the scale of the second region 701 from the scale of the presentation 700, 800. In an implementation, the zooming-in is progressive. In an implementation, the scale of the focal region 820 remains constant during the zooming-in.

At step 1406, the method ends.

The sequences of instructions which when executed cause the method described herein to be performed by the exemplary data processing system 300 of FIG. 3 can be contained in a data carrier product according to one embodiment. This data carrier product can be loaded into and run by the exemplary data processing system 300 of FIG. 3.

The sequences of instructions which when executed cause the method described herein to be performed by the exemplary data processing system 300 of FIG. 3 can be contained in a computer software product according to one embodiment. This computer software product can be loaded into and run by the exemplary data processing system 300 of FIG. 3.

The sequences of instructions which when executed cause the method described herein to be performed by the exemplary data processing system 300 of FIG. 3 can be contained in an integrated circuit product including a coprocessor or memory according to one embodiment. This integrated circuit product can be installed in the exemplary data processing system 300 of FIG. 3.

Although embodiments have been described herein, it will be understood by those skilled in the art that variations may be made thereto without departing from the spirit or the scope of the appended claims.

What is claimed is:

1. A method comprising:
constructing an appearance of a lens by a data processing system for display of a selected region of an image to magnify the selected region of the image in comparison with a portion of the image outside of the appearance of the lens; and
constructing a zoomed-in view of the image by the data processing system by increasing magnification of the portion of the image outside the appearance of the lens successively as an animation until the magnification of the portion of the image outside of the appearance of the lens corresponds with the magnification of the selected region of the image within the appearance of the lens at which point the appearance of the lens is no longer displayed.

2. The method of claim 1, wherein:
the constructing of the appearance of the lens is performed in response to receipt of a signal that indicates that the selected region of the image is to be selected; and
the constructing of the zoomed-in view is performed in response to receipt of a signal indicating that the displaying of the appearance of the lens is to be replaced by the zoomed-in view.

3. The method of claim 1, wherein the constructing of the zoomed-in view includes moving the image on a display to center the appearance of the lens on the display.

4. The method of claim 3, wherein the zoomed-in view is displayed simultaneously with the moving of the image on the display.

5. The method of claim 1, wherein the appearance of the lens remains stationary for display as the zoomed-in view is displayed.

6. The method of claim 1, wherein the magnification of the selected region of the image stays constant as the zoomed-in view is displayed.

7. The method of claim 1, wherein the constructing of the appearance of the lens includes magnifying the selected region at a scale greater than the portion of the image outside of the appearance of the lens.

8. The method of claim 1, wherein the appearance of the lens includes a shoulder region that surrounds a focal region to provide a transition between a magnification of the focal region and the portion of the image outside the appearance of the lens.

9. The method of claim 1, wherein the appearance of the lens is of a fisheye lens.

10. A method comprising:
receiving a signal at a data processing system to zoom-out from a magnified view of an image; and
displaying an animation by the data processing system in response to the receiving, the animation including an appearance of a lens for a region of the magnified view of the image having a magnification that remains constant as a magnification of a portion of the image outside of the appearance of the lens is decreased.

11. The method of claim 10, wherein the displaying includes moving the image on a display to center the appearance of the lens on the display.

12. The method of claim 10, wherein the appearance of the lens remains stationary on a display for the displaying.

13. The method of claim 10, wherein the displaying includes magnifying the region at a scale greater than the portion of the image outside of the appearance of the lens.

14. The method of claim 10, wherein the appearance of the lens includes a focal region that corresponds to the region and a shoulder region that surrounds the focal region to provide a transition between the magnification of the focal region and the portion of the image outside the appearance of the lens.

15. The method of claim 14, wherein the transition is continuous.

16. The method of claim 10, wherein the appearance of the lens is of a fisheye lens.

17. An article of manufacture including a computer-readable medium device having instructions stored thereon that, in response to execution by a data processing system, causes the data processing system to perform operations comprising:
displaying an appearance of a lens for a selected region of an image to magnify the selected region of the image in comparison with a portion of the image outside of the appearance of the lens; and
displaying an animation that includes increasing magnification of the portion of the image outside the appearance of the lens until the magnification of the portion of the image outside of the appearance of the lens corresponds with the magnification of the selected region of the image within the appearance of the lens at which point the appearance of the lens is no longer displayed.

18. The article of manufacture of claim 17, wherein:
the displaying the appearance of the lens is performed in response to receipt of a signal that indicates that the selected region of the image is to be selected; and
the displaying of the animation is performed in response to receipt of a signal indicating that the displaying of the appearance of the lens is to be replaced by the animation.

19. The article of manufacture of claim 17, wherein the displaying of the animation includes moving the image on a display to center the appearance of the lens on the display.

20. The article of manufacture of claim 17, wherein the appearance of the lens remains stationary on a display as the displaying of the animation is performed.

21. The article of manufacture of claim 17, wherein the magnification of the selected region of the image stays constant as the displaying of the animation is performed.

22. The article of manufacture of claim 17, wherein the selected region is magnified at a scale greater than the portion of the image outside of the appearance of the lens as the displaying of the appearance of the lens is performed.

23. The article of manufacture of claim 17, wherein the appearance of the lens includes:
a focal region that includes the selected region having the magnification; and
a shoulder region that surrounds the focal region to provide a transition between the magnification of the focal region and the portion of the image outside the appearance of the lens.

24. The article of manufacture of claim 17, wherein the appearance of the lens is of a fisheye lens.

25. An article of manufacture including a computer-readable medium device having instructions stored thereon that, if executed by a data processing system, causes the data processing system to display an animation including an appearance of a lens for a region of a magnified view of an image having a magnification that remains constant as a magnification of a portion of the image outside of the appearance of the lens is decreased.

26. The article of manufacture of claim 25, wherein the display of the animation includes moving the image on a display to center the appearance of the lens on the display.

27. The article of manufacture of claim 25, wherein the appearance of the lens remains stationary on a display as the animation is displayed.

28. The article of manufacture of claim 25, wherein the region is magnified at a scale greater than the portion of the image outside of the appearance of the lens as the animation is displayed.

29. The article of manufacture of claim 25, wherein the appearance of the lens includes a focal region that corresponds to the region and a shoulder region that surrounds the focal region to provide a transition between the magnification of the focal region and the portion of the image outside the appearance of the lens.

30. The article of manufacture of claim 25, wherein the appearance of the lens is of a fisheye lens.

31. A method comprising:
constructing an animation by a data processing system, the animation including an appearance of a lens for a region of a magnified view of an image having a magnification that remains constant as a magnification of a portion of the image outside of the appearance of the lens is decreased; and
causing display of the animation by the data processing system.

32. The method of claim 31, wherein the causing of the display of the animation includes moving the image on a display to center the appearance of the lens on the display.

33. The method of claim 31, wherein the causing of the display of the animation is performed such that the appearance of the lens remains stationary.

34. The method of claim 31, wherein the region is magnified at a scale greater than the portion of the image outside of the appearance of the lens as the animation is displayed.

35. The method of claim 31, wherein the appearance of the lens includes a focal region that corresponds to the region and a shoulder region that surrounds the focal region to provide a transition between the magnification of the focal region and the portion of the image outside the appearance of the lens.

36. The method of claim 31, wherein the appearance of the lens is of a fisheye lens.

* * * * *

UNITED STATES PATENT AND TRADEMARK OFFICE
CERTIFICATE OF CORRECTION

PATENT NO. : 8,139,089 B2
APPLICATION NO. : 12/388437
DATED : March 20, 2012
INVENTOR(S) : Doyle et al.

Page 1 of 1

It is certified that error appears in the above-identified patent and that said Letters Patent is hereby corrected as shown below:

On Page 2, in Item (56), under "OTHER PUBLICATIONS", in Column 1, Line 12,
delete "Dornink et el." and insert -- Dootnink et al. --, therefor.

On Page 4, in Item (56), under "OTHER PUBLICATIONS", in Column 1, Line 12,
delete "ifugres" and insert -- figures --, therefor.

On Page 5, in Item (56), under "OTHER PUBLICATIONS", in Column 1, Line 9,
delete "46-43," and insert -- 46-53, --, therefor.

On Page 5, in Item (56), under "OTHER PUBLICATIONS", in Column 1, Line 20,
delete "an" and insert -- and --, therefor.

Signed and Sealed this
Fourteenth Day of August, 2012

David J. Kappos
*Director of the United States Patent and Trademark Office*